United States Patent
Gangopadhyay et al.

(10) Patent No.: US 12,351,462 B1
(45) Date of Patent: Jul. 8, 2025

(54) GRAPHITE SHAPING AND COATING DEVICES, SYSTEMS, AND METHODS

(71) Applicant: Urbix, Inc., Mesa, AZ (US)

(72) Inventors: Palash Gangopadhyay, Chapel Hill, NC (US); Andrea Cabrero Vilatela, Mexico City (MX); Kurumi Austin, Tempe, AZ (US)

(73) Assignee: Urbix, Inc., Mesa, AZ (US)

( * ) Notice: Subject to any disclaimer, the term of this patent is extended or adjusted under 35 U.S.C. 154(b) by 0 days.

(21) Appl. No.: 18/927,286

(22) Filed: Oct. 25, 2024

(51) Int. Cl.
| | |
|---|---|
| *C01B 32/21* | (2017.01) |
| *B05C 19/00* | (2006.01) |
| *H01M 4/36* | (2006.01) |
| *H01M 4/587* | (2010.01) |

(52) U.S. Cl.
CPC ............. *C01B 32/21* (2017.08); *B05C 19/00* (2013.01); *H01M 4/366* (2013.01); *H01M 4/587* (2013.01); *C01P 2004/03* (2013.01); *C01P 2004/80* (2013.01); *C01P 2006/11* (2013.01); *C01P 2006/40* (2013.01)

(58) Field of Classification Search
CPC ........ C01B 32/21; B05C 19/00; H01M 4/366; H01M 4/587; C01P 2004/03; C01P 2004/80; C01P 2006/11; C01P 2006/40
See application file for complete search history.

(56) References Cited

U.S. PATENT DOCUMENTS

| | | |
|---|---|---|
| 4,915,987 A | 4/1990 | Nara et al. |
| 5,628,945 A | 5/1997 | Riman et al. |
| 5,656,087 A | 8/1997 | Kikuchi et al. |
| 5,856,043 A | 1/1999 | Ohsaki et al. |
| 6,139,990 A | 10/2000 | Kubota et al. |
| 6,541,156 B1 | 4/2003 | Fuse et al. |
| 8,119,287 B2 | 2/2012 | Miyamoto et al. |
| 8,153,303 B2 | 4/2012 | Ishii |
| 8,999,580 B2 | 4/2015 | Sotowa et al. |

(Continued)

FOREIGN PATENT DOCUMENTS

| | | |
|---|---|---|
| CA | 2246953 A1 | 9/1999 |
| CA | 3241509 A1 | 6/2023 |

(Continued)

OTHER PUBLICATIONS

Ohzeki et al., "Shape modification of graphite particles by rotational impact blending", Carbon 43, Jul. 2005, pp. 1673-1679.

(Continued)

*Primary Examiner* — Andrew J. Oyer
(74) *Attorney, Agent, or Firm* — Womble Bond Dickinson (US) LLP

(57) ABSTRACT

Devices, methods, products, and systems for shaping and coating graphite are disclosed. The method includes providing a volume of purified graphite particles in a chamber of a shaping and coating machine, rotating the volume of purified graphite particles at a first speed for a first length of time in the chamber to form Spherical Purified Graphite (SPG) particles, providing a first powder coating material in the chamber of the shaping and coating machine, and rotating the first powder coating material and the SPG particles at a second speed and for a second length of time in the chamber to form Coated Spherical Purified Graphite (CSPG) particles.

12 Claims, 7 Drawing Sheets

(56) References Cited

U.S. PATENT DOCUMENTS

| | | | |
|---|---|---|---|
| 9,099,742 B2 | 8/2015 | Nishimura et al. | |
| 9,178,213 B2 | 11/2015 | Kim et al. | |
| 9,240,587 B2 | 1/2016 | Kameda et al. | |
| 9,299,978 B2 | 3/2016 | Murata et al. | |
| 9,543,583 B2 | 1/2017 | Nakamura et al. | |
| 9,583,760 B2 | 2/2017 | Mutoh et al. | |
| 9,966,594 B2 | 5/2018 | Kim et al. | |
| 11,031,587 B2 | 6/2021 | Ishii et al. | |
| 11,961,996 B2 | 4/2024 | Yamada et al. | |
| 2002/0197201 A1 | 12/2002 | Fukuda et al. | |
| 2003/0219652 A1 | 11/2003 | Yoshida | |
| 2006/0286025 A1 | 12/2006 | Spahr et al. | |
| 2009/0267250 A1 | 10/2009 | Inada et al. | |
| 2013/0130117 A1 | 5/2013 | Yamamoto et al. | |
| 2015/0270535 A1 | 9/2015 | Takeuchi et al. | |
| 2021/0057734 A1* | 2/2021 | de Savio Silva | H01M 4/0471 |
| 2023/0352686 A1 | 11/2023 | Yamada et al. | |

FOREIGN PATENT DOCUMENTS

| | | |
|---|---|---|
| CN | 1397598 A | 2/2003 |
| CN | 1793047 A | 6/2006 |
| CN | 1827301 A | 9/2006 |
| CN | 101367518 A | 2/2009 |
| CN | 101392105 A | 3/2009 |
| CN | 101850964 A | 10/2010 |
| CN | 102347481 A | 2/2012 |
| CN | 102951633 A | 3/2013 |
| CN | 103904302 A | 7/2014 |
| CN | 104201343 A | 12/2014 |
| CN | 107768669 A | 3/2018 |
| CN | 109485040 A | 3/2019 |
| CN | 110817858 A | 2/2020 |
| CN | 210935208 U | 7/2020 |
| CN | 112110444 A | 12/2020 |
| CN | 112201377 A | 1/2021 |
| CN | 112408382 A | 2/2021 |
| CN | 213434931 U | 6/2021 |
| CN | 114178032 A | 3/2022 |
| CN | 115364985 A | 11/2022 |
| DE | 102023122651 B3 | 7/2024 |
| EP | 1128224 A2 | 8/2001 |
| EP | 2667435 B1 | 4/2018 |
| EP | 3032620 B1 | 1/2020 |
| EP | 4495451 A1 | 1/2025 |
| JP | H0632607 A | 2/1994 |
| JP | H0982326 A | 3/1997 |
| JP | H0992286 A | 4/1997 |
| JP | H10140425 A | 5/1998 |
| JP | H10261406 A | 9/1998 |
| JP | H11195414 A | 7/1999 |
| JP | H11250911 A | 9/1999 |
| JP | H11268907 A | 10/1999 |
| JP | 2000199131 A | 7/2000 |
| JP | 2000226206 A | 8/2000 |
| JP | 2001210329 A | 8/2001 |
| JP | 2002179419 A | 6/2002 |
| JP | 2003119014 A | 4/2003 |
| JP | 2003173774 A | 6/2003 |
| JP | 2003238135 A | 8/2003 |
| JP | 2003308845 A | 10/2003 |
| JP | 2004185975 A | 7/2004 |
| JP | 2006030456 A | 2/2006 |
| JP | 2006276714 A | 10/2006 |
| JP | 2007169154 A | 7/2007 |
| JP | 2007184252 A | 7/2007 |
| JP | 2008024588 A | 2/2008 |
| JP | 2008112710 A | 5/2008 |
| JP | 2008277231 A | 11/2008 |
| JP | 2008305722 A | 12/2008 |
| JP | 2009158105 A | 7/2009 |
| JP | 4416232 B2 | 2/2010 |
| JP | 2010086955 A | 4/2010 |
| JP | 2012033375 A | 2/2012 |
| JP | 2012033376 A | 2/2012 |
| JP | 2012164681 A | 8/2012 |
| JP | 5063663 B2 | 10/2012 |
| JP | 2012209202 A | 10/2012 |
| JP | 5143437 B2 | 2/2013 |
| JP | 5196365 B2 | 5/2013 |
| JP | 5229664 B2 | 7/2013 |
| JP | 5257740 B2 | 8/2013 |
| JP | 5320671 B2 | 10/2013 |
| JP | 2013222641 A | 10/2013 |
| JP | 5413645 B2 | 2/2014 |
| JP | 2014114197 A | 6/2014 |
| JP | 5563578 B2 | 7/2014 |
| JP | 2014167906 A | 9/2014 |
| JP | 5636149 B2 | 12/2014 |
| JP | 5641613 B2 | 12/2014 |
| JP | 2015153496 A | 8/2015 |
| JP | 2016143560 A | 8/2016 |
| JP | 6634720 B2 | 10/2016 |
| JP | 2016178074 A | 10/2016 |
| JP | 2016222475 A | 12/2016 |
| JP | 2017010651 A | 1/2017 |
| JP | 2017062898 A | 3/2017 |
| JP | 2017063040 A | 3/2017 |
| JP | 6126902 B2 | 5/2017 |
| JP | 2017111958 A | 6/2017 |
| JP | 2019019048 A | 2/2019 |
| JP | 2019087541 A | 6/2019 |
| JP | 2019160791 A | 9/2019 |
| JP | 7099005 B2 | 10/2019 |
| JP | 6619123 B2 | 12/2019 |
| JP | WO2019031597 A1 | 2/2020 |
| JP | 6707935 B2 | 6/2020 |
| JP | 2020087916 A | 6/2020 |
| JP | 2020527283 A | 9/2020 |
| JP | 6801171 B2 | 12/2020 |
| KR | 970001217 A | 1/1997 |
| KR | 19990024809 A | 4/1999 |
| KR | 20020042586 A | 6/2002 |
| KR | 100626783 B1 | 9/2006 |
| KR | 20130037150 A | 4/2013 |
| KR | 20150058205 A | 5/2015 |
| KR | 20170009830 A | 1/2017 |
| KR | 102078606 B1 | 2/2020 |
| KR | 102477729 B1 | 12/2022 |
| KR | 102500915 B1 | 2/2023 |
| KR | 20250020957 A | 2/2025 |
| TW | 201235296 A | 9/2012 |
| WO | 2012014785 A1 | 2/2012 |
| WO | 2012105669 A1 | 8/2012 |
| WO | 2014024473 A1 | 2/2014 |
| WO | 2014092141 A1 | 6/2014 |
| WO | 2014178093 A1 | 11/2014 |
| WO | 2019131860 A1 | 7/2019 |
| WO | 2019131863 A1 | 7/2019 |
| WO | 2019131864 A1 | 7/2019 |
| WO | 2019151201 A1 | 8/2019 |
| WO | 2020137909 A1 | 7/2020 |
| WO | 2021002384 A1 | 1/2021 |
| WO | 2021002385 A1 | 1/2021 |
| WO | 2021166812 A1 | 8/2021 |
| WO | 2021192648 A1 | 9/2021 |
| WO | 2021192651 A1 | 9/2021 |
| WO | 2023224177 A1 | 11/2023 |
| WO | 2024003801 A1 | 1/2024 |
| WO | 2024047598 A1 | 3/2024 |
| WO | 2024102624 A2 | 5/2024 |
| WO | 2024130318 A1 | 6/2024 |
| WO | 2025033765 A1 | 2/2025 |

OTHER PUBLICATIONS

Mundzinger et al., "Morphology and texture of spheroidized natural and synthetic graphites", Carbon 111, 2017, pp. 764-773.

Amnatsin et al., "Ultrafine Graphite Scrap and Carbon Blocks Prepared by High-Solid-Loading Bead Milling and Conventional Ball Milling: A Comparative Assessment", ACS Omega 2023, 8 (50), pp. 47919-47927.

(56) References Cited

OTHER PUBLICATIONS

Fischer et al., "Impacts of Spheroidization of Natural Graphite on Fast-Charging Capability of Anodes for LIB", Batteries 2023, 9, 305, 19 pages.
Gottschalk et al., "Spherical Graphite Anodes: Influence of Particle Size Distribution and Multilayer Structuring in Lithium-Ion Battery Cells", Batteries 2024, 10, 40, 18 pages.
Asenbauer et al., "The success story of graphite as a lithium-ion anode material—fundamentals, remaining challenges, and recent developments including silicon (oxide) composites", Sustainable Energy Fuels, 2020, 4, pp. 5387-5416.
Kwon et al., "Achieving High-Performance Spherical Natural Graphite Anode through a Modified Carbon Coating for Lithium-Ion Batteries", Energies 2021, 14, 1946, 14 pages.
Liu et al., "Current and future lithium-ion battery manufacturing", iScience 24, 102332, Apr. 23, 2021, 17 pages.
Chen, Jiajun, "Recent Progress in Advanced Materials for Lithium Ion Batteries", Materials 2013, 6, pp. 156-183.
Kim et al., "Effect and Mechanism of Pitch Coating on the Rate Performance Improvement of Lithium Ion Batteries", Materials 2022, 15, 4713, 13 pages.
Choi et al., "Optimization of Pore Characteristics of Graphite-Based Anode for Li-Ion Batteries by Control of the Particle Size Distribution", Materials 2023, 16, 6896, 16 pages.
Banek et al., "Sustainable conversion of biomass to rationally designed lithium-ion battery graphite", Scientific Reports 2022, 12, 8080, 11 pages.

* cited by examiner

Interrelated machine parameters and their impact on the tap density, g/cc

Interrelated machine parameters and their impact on the median particle size, D50

GRAPHITE SHAPING AND COATING DEVICES, SYSTEMS, AND METHODS

TECHNICAL FIELD

The present invention relates to graphite processing devices, systems, and methods, and more particularly, to devices, systems and methods that shape and coat graphite particles in a single step, and graphite products formed therefrom for use as negative electrode materials.

BACKGROUND

Lithium-ion batteries have been widely adopted for powering electronic devices. Natural and synthetic graphite is often used as an anode active material in lithium-ion batteries due to its ability to reversibly intercalate lithium as a battery charges and discharges. To be useful as an anode active material, it has been found that shaping graphite into spheres (i.e., spheroidization) increases the powder tap density. This, in turn, improves the packing density and volumetric capacity of the graphite. Spheroidization of graphite offers other benefits, such as enhancing electrochemical performance of the anode and alleviating graphite exfoliation during intercalation.

SUMMARY

According to some embodiments of the present inventive concept, a method of shaping and coating graphite is provided. The method includes providing graphite particles in a chamber of a shaping and coating machine designed to facilitate particle shaping and coating in a single step (e.g., a single process step) within the same equipment, wherein at least one portion of the graphite particles comprises purified natural graphite particles. The method additionally includes rotating the graphite particles at a first speed for a first length of time in the chamber to form Spherical Purified Graphite (SPG) particles. The method further includes providing a first powder coating material in the chamber of the shaping and coating machine and rotating the first powder coating material and the SPG particles at a second speed and for a second length of time in the same chamber to form Coated Spherical Purified Graphite (CSPG) particles, without breaking the process cycle. Notably, as described further herein and in some embodiments, both the shaping and coating steps may be performed as a single batch step, which may also be referred to as a single process step, in the same equipment (i.e., the shaping and coating machine) consecutively, and in immediate succession.

According to further embodiments of the present inventive concept, a graphite shaping and coating machine is provided. The graphite shaping and coating machine includes a treatment chamber configured to receive graphite particles and a first powder coating material, a motor, and a controller. In some embodiments, the controller is configured to cause the motor to rotate the graphite particles at a first speed for a first length of time in the treatment chamber to form SPG particles and consecutively rotate the first powder coating material and the SPG particles at a second speed and for a second length of time in the chamber to form CSPG particles.

According to further embodiments of the present inventive concept, a negative electrode material is provided. The negative electrode material may include a graphite core. The graphite core may be spherical in shape, comprise a blend of purified natural graphite and synthetic graphite, and the blend may comprise a ratio of a first weight percent (wt. %) of the purified natural graphite and a second wt. % of the synthetic graphite that is between 30:70 and 70:30.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION

Shaping natural and synthetic flake graphite into spherical graphite particles reduces a surface area of the graphite and has been shown to improve the lithium intercalation and volumetric capacity of the graphite when used as a negative electrode material in lithium-ion batteries. Coating the spherical graphite particles with a carbon coating may be desired, as the coating may further decrease graphite exfoliation, inhibit degradation and, thus, increase the performance and life span of the lithium-ion batteries.

Graphite processing is a multi-step process. Conventional methods of shaping and coating graphite are inefficient, as conventional methods employ an initial graphite milling process typically including multiple steps, during which the graphite is mechanically milled to obtain a desired particle size and shape. A graphite purification step is then performed at some point after the initial milling step, during which the milled graphite particles are purified (e.g., chemically or thermally) to remove impurities, and finally, in yet a further step, the spherical, purified graphite particles are coated with a pitch material that is later heat-treated in a furnace to transform the pitch into a carbon coating. The devices, systems, and methods set forth herein improve such conventional graphite processing methods, in part, by providing shaping and coating of graphite (i.e., graphite particles) in a same or single batch step at a single machine. In this way, graphite processing and manufacturability improves.

Additionally, as described further herein, this advanced process, in which a shaping and coating machine is used to combine the coating material with the core particle, notably allows the coating material to be part of and/or form portions of the spherical particle shape, i.e., filling what would be empty space in a conceptual sphere superimposed over an underlying non-spherical core particle, minimizing the absolute surface area and the variation in surface area. This is in direct contrast to existing technologies in which a non-spherical core particle is subsequently coated in a separate operation and wherein the coating will only be formed on the surface of the core particle. Non-spherical particles are typically generated by fracturing bulk graphite structures in a milling or shaping process in the prior art. In this way, graphite processing may be simplified and, thus, optimized for efficiency. Energy savings may also be realized by way of executing shaping and coating of graphite in discrete batches.

Figure 1:
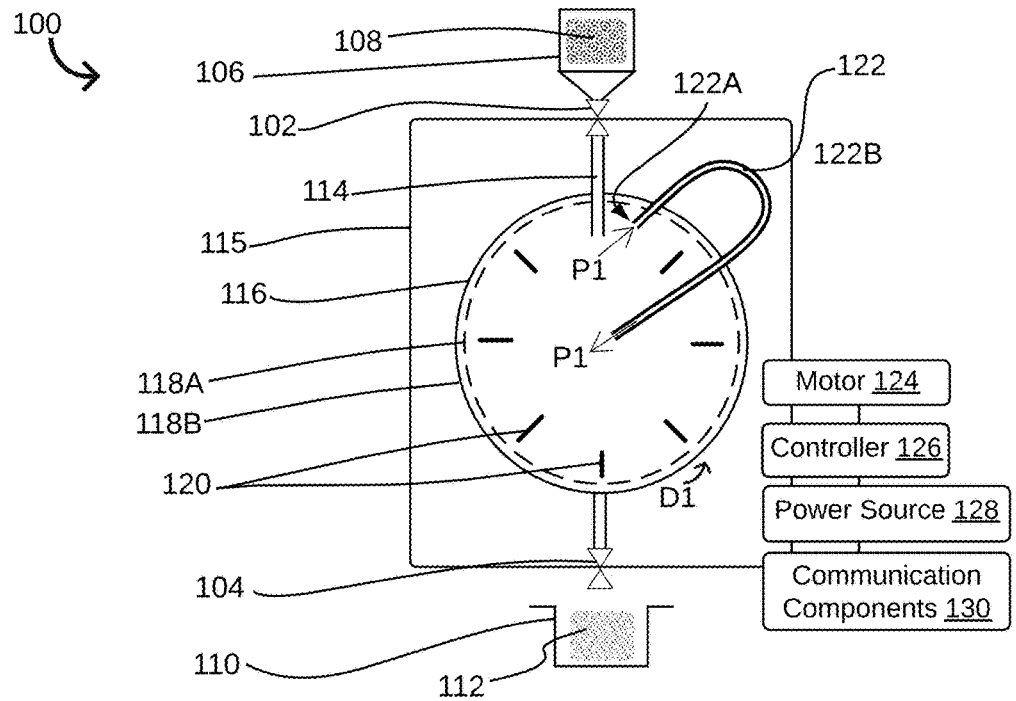
FIG. 1 is a schematic diagram illustrating a graphite shaping and coating device according to some embodiments.

Stated differently, and in contrast to conventional methods of processing graphite, the shaping and coating processes described herein may advantageously be performed in immediate succession (e.g., as sub-steps) during a single, discrete batch process step carried out at a single graphite shaping and coating device or machine (i.e., see shaping and coating machine (SCM) 100, current FIG. 1). In this way, the graphite shaping and coating machine may perform a single batch process comprised of a shaping step and one or more optional sub-steps (e.g., blending step(s), coating step(s) and/or the like), which advantageously reduces both the time and energy associated with processing graphite. Further, the novel coating methods set forth herein utilize solid-phase (i.e., powder) coating materials, which obviate the difficulties and high energy usage, and costs associated with using gas or liquid-phase coating materials.

Additionally, as persons having skill in the art will appreciate, the shaping and coating processes described herein may be performed on purified graphite. As used herein, and in reference to graphite, the term "purified" refers to graphite having a carbon purity level of 99.9 wt. % carbon (C) or more as measured by the Loss On Ignition (LOI) method and/or graphite having less than 30 ppm in total elemental impurities as measured by ETV-IP-OES spectroscopy. As specific examples, and consistent with the earlier definition, purified graphite may refer to graphite having a carbon purity level of 99.95 wt. % C (LOI), or even 99.99 wt. % C (LOI), in some cases. The methods described herein may simplify and improve conventional graphite processing by way of purifying flake graphite prior to shaping (i.e., purifying pre-spheroidized graphite). That is, the shaping and coating batch processes as described herein may be applied to purified graphite. In this way, the graphite purification may be performed at lower times and/or temperatures compared to conventional methods of purifying post-shaped (i.e., post-spheroidized) graphite particles. Conventional methods of post-spheroidization purification may require heating the graphite particles to higher temperatures for longer durations of time in order to remove impurities residing internally (e.g., within pores) of the shaped/spheroidized graphite. In this way, time and cost savings may be realized, and manufacturability may be simplified by virtue of implementing the devices, methods, and systems of treating purified graphite as described herein.

Referring now to FIG. 1, a schematic diagram illustrating a Shaping and Coating Machine (SCM) 100 is provided, according to some embodiments. As described herein, the SCM 100 is configured to execute and carry out an advanced dry milling and powder impact coating process, particularly suitable for shaping and coating particles such as graphite. The system operates without solvents or toxic chemicals, making it environmentally friendly and cost-effective for producing composite particles (e.g., composite graphite particles). As described further below, several different types of forces are involved in the shaping and coating process imparted by the SCM 100, including at least centrifugal force, kinetic impact force, and viscous drag, which together bend, compact, and spheroidize flat graphite flakes into spherical particles as described below. These three types of mechanically induced forces further enable high tap density, improved particle sphericity, and controlled particle size distribution, which are significant for applications like lithium-ion batteries. The SCM 100 facilitates a continuous recirculation of particles, thus ensuring uniform exposure to the mechanical forces, which leads to consistent shaping and coating of graphite particles as described herein. The SCM 100 and respective shaping and coating process supports fine guest particles (i.e., powder coating materials) adhering to host particles (i.e., graphite particles) through van der Waals and mechanical forces, enabling surface modifications for optimized performance. This method allows for precise control over tap density, specific surface area (SSA), and particle size, making it a versatile tool in high-energy dry particle systems.

Referring again to FIG. 1, the SCM 100 may include a powder feed valve 102 configured to supply one or more powder feed materials (e.g., purified natural graphite, synthetic graphite, coating materials, and/or the like) to be processed by the SCM 100 as described herein. After the SCM 100 executes a shaping and/or coating process, the processed material may exit or otherwise be discharged from the SCM 100 via a powder discharge valve 104. The powder feed valve 102 may be coupled to and/or connected with a powder feed container 106 (e.g., a hopper, a drum, a vessel, and/or the like) where a feed material 108, such as a powder feed material, may be stored until a batch process performed by the SCM 100 is initiated. The feed materials 108 described herein are comprised of a plurality of particles to be shaped and/or coated. Similarly, the powder discharge valve 104 may be coupled to and/or connected with a discharged product container 110 (e.g., a bucket, a drum, a canister, and/or the like) where a processed powder or discharged product 112 may be output from the SCM 100 and stored until ready for transport to a subsequent machine and/or processing step (e.g., testing, packaging, and/or the like).

The powder feed valve 102 is operable in and/or movable between an open position and a closed position. In the open position, the powder feed valve 102 is operable to facilitate the transfer or flow of feed material 108 from the powder feed container 106 into a feed supply inlet or duct 114 of the SCM 100. In the closed position, the powder feed valve 102 is configured to seal the powder feed container 106 and/or the SCM 100, thus inhibiting the transfer of feed material 108 between the powder feed container 106 and the duct 114. The duct 114 is configured to supply the feed material 108 to a treatment chamber 116 of the SCM 100. The SCM 100 may include a cover, jacket, support member, shell, or other type of housing structure 115 disposed on, over, and/or around the treatment chamber 116, according to some embodiments.

The treatment chamber 116 of the SCM 100 may include one or more rotatable components or structures 118A and one or more stationary components, such one or more support structures 118B, that support and/or facilitate rotation of the rotatable structure 118A. As an example, the rotatable structure 118A of the SCM 100 may comprise a rotor, a wheel, or any other type of rotatable structure (e.g., a drum, a basket, a bowl, etc.) that is configured to rotate inside of and/or respective to the support structure 118B. The support structure 118B may comprise a stator, a frame, and/or the like, for supporting rotatable structure 118A during rotation. In some cases, the support structure 118B includes a motor-driven transmission, or a component thereof, that is configured to rotate the rotatable structure 118A to process graphite according to a batch process. That is, the feed material 108 may enter the treatment chamber 116 and be rotated in a direction D1 by way of rotating the rotatable structure 118A during a batch process including particle shaping and/or coating. The rotational direction D1 may be counterclockwise (as shown) respective to a single rotation axis, however, clockwise rotation is also contemplated. Rotation around two or more axes and/or in multiple planes is also contemplated.

As described further below, and in some cases, the rotatable structure 118A of the treatment chamber 116 may rotate two or more feed materials 108 (e.g., a first powder feed material comprising purified natural graphite flakes and a second powder feed material comprising synthetic graphite flakes) together for mixing or blending the powder feed materials together to form a homogenous mixture. The mixture may then be rotated, contemporaneously, to form spherical (i.e., spheroidized) particles having a blended composition. For example, spherical particles having a composition comprised of both natural graphite and synthetic graphite may be formed by the SCM 100.

In other cases, the rotatable structure 118A of the treatment chamber 116 may rotate a single type of feed material 108 (e.g., purified natural graphite, synthetic graphite, etc.) to spheroidize the feed material 108 in the treatment chamber 116. The rotatable structure 118A of the treatment chamber 116 may subsequently rotate (e.g., immediately after shaping and introducing a coating material to the SCM 100) the spheroidized particles with a powder coating material (i.e., a type of feed material 108) to coat the spheroidized particles. According to some embodiments, the rotatable structure 118A is configured to rotate or move at a speed or linear velocity that is greater than about 50 meters/second (m/s). For example, the rotatable structure 118A may rotate at a linear velocity between 65 and 100 m/s, between 65 and 85 m/s, between 65 and 75 m/s, or any other desired range. Additional speeds or velocities (e.g., greater than 100 m/s) are also contemplated. The rotatable structure 118A may rotate at a same speed/velocity during a shaping and a coating sub-steps of a batch process, or different speeds/velocities during the shaping and the coating sub-steps of the batch process. As used herein, the speed or linear velocity of the particles refers to an average speed or average velocity associated with movement of particles inside the treatment chamber 116.

Still referring to FIG. 1, and in some embodiments, the SCM 100 may include one or more impact structures 120 disposed in the treatment chamber 116. The impact structures 120 may be disposed on the rotatable structure 118A, on the support structure 118B, or on any other portion or structure associated with the treatment chamber 116 (e.g., disposed on a wall, a door, a surface, etc.). The impact structures 120 may comprise blades, teeth, spikes, tines, paddles, or any other projecting type of structure or design configured to impact particles of material as the material rotates inside of the treatment chamber 116.

The impact structures 120 are configured to assist in the mixing, shaping, and/or coating of the one or more feed materials 108 as the materials exit the duct 114 and enter the treatment chamber 116. For example, as a material rotates inside of the treatment chamber 116, individual particles of material may physically impact other particles of material as well as the impact structures 120 such that the individual particles (e.g., flakes) bend, fold and ultimately spheroidize while rotating inside the treatment chamber 116 to form spheroidized particles. Similarly, as the spheroidized particles rotate inside of the treatment chamber, a powder coating material may be introduced into the treatment chamber 116 via the duct 114. Individual particles of the powder coating material may physically impact the spheroidized particles, as well as the impact structures 120, causing the coating particles to deform (e.g., via bending, folding, and/or the like) and ultimately form a coating over the spheroidized particles while in the treatment chamber 116. In this way, the SCM 100 may shape and coat the feed material 108 in a single batch process.

The SCM 100 may further comprise a powder recirculation pipe or duct 122. The recirculation duct 122 includes a duct inlet 122A and a duct outlet 122B disposed inside the treatment chamber 116. As material is rotating inside of the treatment chamber 116, a portion of the material may enter the duct inlet 122A (e.g., by way of the rotational forces generated and/or imparted by 118A) and become routed along a material flow path P1 that extends outside of the treatment chamber 116. As material flows along the recirculation duct 122, it may accelerate in speed before re-entering the treatment chamber 116. The material may move along material flow path P1 and become routed back into the treatment chamber 116 via the duct outlet 122B. In this way, at least some of the rotating material is routed outside of the treatment chamber 116 via recirculation duct 122 and then returned back inside of the treatment chamber 116 at an accelerated speed while other material continues to rotate inside of the treatment chamber 116. The multi-directional rotation and flow of the material facilitates a greater number of high-impact collisions of individual particles of material inside of the treatment chamber 116. As a result of these collisions, and in combination with collisions between the particles and the impact structures 120, the particles are caused to deform and, ultimately, spheroidize. Similarly, the collisions facilitated by routing particles along the recirculation duct 122 further result in the spheroidized particles to be impacted by and, thus, coated with a powder coating material as a coating material is fed into the treatment chamber 116.

Figure 2A:
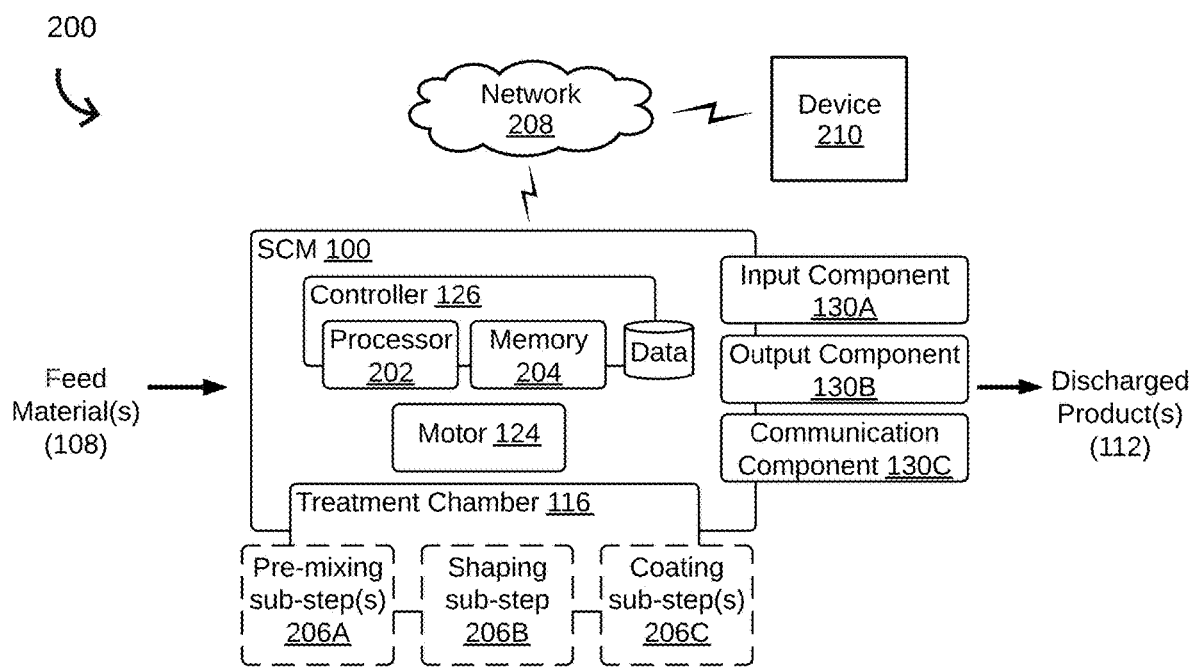
FIG. 2A is a block diagram illustrating an example graphite shaping and coating system and method steps performed by system components according to some embodiments.
Figure 2B:
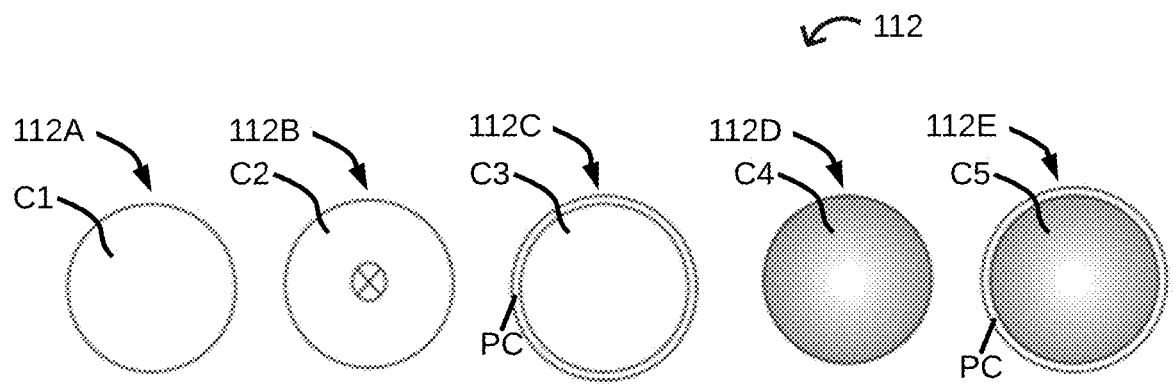
FIG. 2B schematically illustrates various example products that may be produced using the graphite shaping and coating devices, systems, and methods described herein according to some embodiments.

Still referring to FIG. 1, the SCM 100 may additionally comprise a motor 124, a controller 126, a power source 128, and one or more communication components 130 (e.g., see 130A, 130B, 130C in FIG. 2). The motor 124 may comprise a brushed or brushless DC motor, an AC motor (e.g., an induction motor), or any other suitable type of motor configured to induce rotation of rotatable member 118A to speeds greater than about 50 m/s. The valves (i.e., 102, 104) and/or the motor 124 may be controlled by the controller 126 to cause various types of material inputs (i.e., described in further detail under FIG. 2A) to be pre-mixed or blended, shaped, and/or coated and ultimately discharged during a single batch process executed by the SCM 100. In this way, several different types of products or outputs (e.g., see FIG. 2B) may be produced. Similarly, the controller 126 may control the motor 124 to rotate at certain parameters (e.g., speeds, times) inducing airflows that control the particle trajectories to provide CSPG outputs having a high tap density, an improved particle sphericity, and a controlled particle size distribution.

Additionally, the controller 126 may be configured to control a temperature of the treatment chamber 116, for example, by instructing a heating or cooling component (e.g., of a temperature-controlling system) to heat or cool the treatment chamber 116 during at least part of a shaping and coating process. The controller 126 may be configured to maintain the temperature of the treatment chamber 116 at or above a minimum temperature setting, at or below a maximum temperature setting, or at a specific temperature setting. Example heating components include a heater (e.g., an induction coil, a resistance heating element, etc.), a thermal jacket, an infrared or radiant heating element, and the like. Example cooling components include a chiller, a cooling jacket (e.g., a jacket having a coolant flowing therethrough), a heat sink, various types of fluid cooling, a heat pipe, cooling imparted by a phase change material (PCM), and the like. Such heating and/or cooling components may be controlled by the controller 126 to adjust or maintain a temperature of the treatment chamber 116, in some embodiments. In this way, particle shaping and/or coating may be enhanced or improved.

As indicated above, FIG. 1 is provided as an example diagram of a SCM 100. Other examples may differ from what is described in connection with FIG. 1.

FIG. 2A is a block diagram illustrating an example graphite shaping and coating system 200 and example method steps performed by the system components according to some embodiments. The graphite shaping and coating system 200 may include the SCM 100, a communications network 208, and/or a device 210. The SCM 100 may include a controller 126 comprised of a processor 202 and a memory 204. The controller 126 is configured to execute computer readable instructions (e.g., data in the form of computer code or programs), via the processor 202 and memory 204, and control the motor 124 and/or valves (i.e., 102, 104, see FIG. 1) to implement various sub-steps (i.e., 206A-206C) of a batch process for shaping and coating graphite. The SCM 100 is configured to process various different types and/or combinations of inputs (i.e., feed materials 108) that, once processed, provide various different types of outputs (i.e., products 112). Data, such as material attributes (e.g., tap density values, particle sizes, wt. % ratios, etc.) associated with the inputs, the outputs, and/or data associated with the SCM 100 (e.g., run times, start/end setpoints, rotational speeds, motor RPMs, etc.) may be communicated between the SCM 100 and the device 210 by way of the communications network 208 as described herein. Additionally, in some cases, the device 210 may send data, such as instructions, to the SCM 100 by way of the communications network 208, for execution by a processor 202 of the SCM 100 and/or for storage by a memory 204 of the SCM 100.

In some cases, the data or instructions executed by the processor 202 may cause the motor 124 to induce rotation of one or more feed materials 108 provided in the treatment chamber 116, as described above, and cause the SCM 100 to execute a single batch process of shaping and/or coating graphite. The single batch process may be comprised of one or more sub-steps, such as a pre-mixing sub-step 206A, a shaping sub-step 206B, and a coating sub-step 206C. The sub-steps may be performed according to specific machine settings (e.g., run times, rotation speeds, etc.), as controlled by the controller 126, which results in the creation of specific products 112. Of note, the pre-mixing sub-step 206A is configured to blend two or more feed materials 108 in advance of shaping and/or coating, the shaping sub-step 206 is configured to spheroidize the feed materials 108 (i.e., either single or multiple powder feed materials) to form products 112 having spherically shaped cores, and the coating sub-step 206C forms one or more optional coatings or layers on the spherically shaped cores of products 112. Uncoated products 112 may include and/or be referred to as Spherical Purified Graphite (SPG) particles. Semi-spherically shaped purified graphite particles having semi-spherical shapes (e.g., ovals, semi-spheres, hemispheres, and/or the like) are also referred to as SPG and examples of SPG. Coated products 112 may include and/or be referred to as Coated Spherical Purified Graphite (CSPG) particles.

Regarding the feed or "inputs" to the system 200, as alluded to earlier, various different types of feed materials 108 may be introduced to the SCM 100 during a batch process. The feed materials 108 may be mixed, shaped, and/or coated to form products 112 having distinct product attributes or components (e.g., distinct cores and/or coatings), as described herein. As an example, and in some cases, a feed material 108 may include purified natural flake graphite or synthetic graphite to be spheroidized and optionally coated. In this way, products 112 having cores comprising spheroidized purified natural graphite, spheroidized synthetic graphite, or spheroidized compositions comprised of both natural and synthetic graphite may be provided. Again, the spheroidized particles (i.e., particles rotated at a first speed for a first duration of time in the SCM 100) form the spherically shaped particle cores of products 112 output by the SCM 100.

Still referring to feed materials 108 for system 200, and in some cases, the feed material 108 may be added to the SCM 100 and spheroidized alone (i.e., resulting in products 112 having spheroidized cores comprised of a single-material) or, alternately, two or more feed materials 108 may be added to the SCM 100 and spheroidized together, at the same time by the SCM 100 (i.e., resulting in products 112 having spheroidized cores comprised of a blend of the two or more feed materials). For example, mixing natural flake graphite with synthetic graphite and shaping the mixture results in products 112 having blended cores, that is, cores with a composition comprising both natural graphite and synthetic graphite. Such products 112 may include cores having a ratio of a weight percent (wt. %) of natural graphite to synthetic graphite that ranges between 30:70 and 70:30. The synthetic graphite may be formed of primary synthetic graphite, secondary synthetic graphite, or a mixture of primary and secondary synthetic graphite in any ratio.

Additional feed materials 108 may include a powder coating material (e.g., a powder pitch material) and one or more optional additives. Such additives may be added prior to the blending or pre-mixing sub-step 206A, prior to the spheroidization or shaping sub-step 206B, or prior to the coating sub-step 206C, or as an additional coating sub-step performed by the SCM 100. Alternately, the additives may be combined with any of the other types of feed materials 108 (e.g., natural graphite, synthetic graphite, pitch). Example additives include powder binder materials, including those for electrode dry coating processes such as PTFE, electrical conductivity-enhancing materials such as carbon nanomaterials, including carbon nanotubes (CNTs) and carbon black and non-carbonaceous materials for increasing capacity, such as nanoparticles of silicon, silicon suboxide, tin and tin oxide.

Referring now to a sequence of adding the feed materials to the SCM 100 in system 200, it will be appreciated that the feed materials 108 may be introduced to the treatment chamber 116 of the SCM 100 in different sequences and/or at various times during the batch process performed by the SCM 100, depending upon a desired product 112 to be output. In some embodiments, computer readable and executable commands, or instructions, for providing distinct types of products 112 are developed and stored as data by the memory 204 of the SCM 100 for execution by the processor 202 when implementing a batch process. The batch process may include one or more optional pre-mixing sub-steps 206A, at least one shaping (i.e., spheroidizing) sub-step 206B, and one or more optional coating sub-steps 206C. Any of the pre-mixing and coating sub-steps 206A and 206C may be repeated in a batch process according to the data stored by the memory 204 and executed by the processor 202 to provide products 112 that may include a blended core comprising at least two materials and/or a core (blended or not blended) having at least two coatings. The coating sub-step 206C may utilize a same material (e.g., pitch) such that multiple distinct coatings of a same material may be applied to a core particle. Alternately, the coating sub-step 206C may utilize different materials such that multiple distinct coatings of different materials may be applied to a core particle.

In some embodiments, the data (e.g., akin to computer readable and executable "recipes") that is stored by the memory 204 and executed by the processor 202 for controlling the SCM 100 may include computer readable instructions associated with the starting and/or stopping of certain events (e.g., sub-steps 206A-206C), instructions associated with the sequencing of events, instructions associated with times and/or durations of time for opening and/or closing valves, durations of time for adding/discharging materials respective to SCM 100, durations of times and/or speeds associated with rotation inside treatment chamber 116 that results in spheroidization, durations of times and/or speeds associated with rotation inside treatment chamber 116 that results in coating(s), and/or the like. In some cases, the controller 126 may execute the computer readable instructions, by the processor 202, and instruct the motor 124 to cause rotation of the feed materials 108 in the SCM 100 for at a given speed and/or for a given time to carry out any of the pre-mixing, shaping, and/or coating sub-steps 206A-206C.

Referring now to the products 112 discharged by system 200, it should be understood that materials forming the products 112 may be layered or stacked in the same order as the materials were sequenced during addition as feed materials 108. As an example, if three materials A, B and C (i.e., feed materials 108) are added to the SCM 100 and pre-mixed during a pre-mixing sub-step 206A and spheroidized during a shaping sub-step 206B, the resulting product 112 discharged by the SCM 100 includes particles (cores) comprising a blend of all three materials A, B and C. In this way, the coating sub-step 206C is optional. If, on the other hand, materials A, B, and C are added to the SCM 100 individually, in sequence and separated by an amount of time to complete each sub-step, then the resulting product 112 discharged by the SCM 100 includes particles having a spheroidized core formed from material A, and the core includes two coatings. A first coating or layer is formed over the core A and comprises material B and a second coating or layer is formed over the first coating B and comprises material C. In this way, the pre-mixing sub-step 206A is optional and the coating sub-step 206C may be repeated. This example is for illustrative purposes only, as less than three materials or more than three materials may be provided for forming customized products 112.

Still referring to FIG. 2A and, as an example, a pre-mixing sub-step 206A may include adding a volume or wt. % of a first feed material 108 in the form of graphite (e.g., purified natural graphite having a 99.9 wt. % C (LOI) or more) to the treatment chamber 116 and subsequently adding a volume or wt. % of a second feed material 108 in the form of graphite (e.g., synthetic graphite) to the treatment chamber 116. More than two feed materials 108 may be added to the treatment chamber 116, in some embodiments. Additionally, the feed materials may include non-graphite powders, such as additives or binders. After adding the feed materials 108 to the treatment chamber 116, the controller 126 may control or instruct the motor to start and, thus, induce rotation of the treatment chamber 116 (i.e., the rotatable portion/structure 118A of the chamber 116, FIG. 1), and particles in the treatment chamber 116, at a speed and duration of time sufficient to mix or blend the feed materials 108 together prior to shaping. An example speed of rotation during the pre-mixing sub-step 206A is between approximately 10 and 100 m/s. The feed materials 108 may be pre-mixed at pre-mixing sub-step 206A for a duration of time between approximately 20 seconds and 3 minutes. As previously indicated, the pre-mixing sub-step 206A is optional, repeatable (e.g., performed a first time to provide products 112 having a blended core and performed a second time to provide the products 112 with a blended coating), and may be performed before or after the respective shaping and coating sub-steps 206B and 206C. The pre-mixing sub-step 206A may be used to blend materials for a product 112 core or coating.

An example shaping sub-step 206B performed by the SCM 100 may include rotating a single feed material 108 or a pre-mixed blend of multiple feed materials 108 at a speed and a duration of time sufficient to cause individual particles of the feed material(s) 108 to impact or collide with other particles and/or impact structures (i.e., 120, FIG. 1) resulting in the individual particles bending, folding, or otherwise deforming into a spherical shape. Smaller flakes are caused to adhere to larger flakes and collectively form spheres when larger and smaller flakes are spheroidized together. The shaping sub-step 206B forms the spherically shaped cores (i.e., C1-C5, FIG. 2B) of the products 112. The controller 126 may control the motor 124 to induce rotation of the treatment chamber 116 and the particles therein at a speed of at least about 50 m/s and a duration of time for at least 5 minutes to shape the feed material(s) 108 into spheres prior to discharge or coating. An example speed of rotation during the shaping sub-step 206B is between about 65 and 100 m/s. An example duration of time for spheroidizing the particles at the shaping sub-step 206B is between approximately 5 and 30 minutes. In some cases, the duration of time for spheroidizing the particles at the shaping sub-step 206B is approximately 7 minutes, approximately 10 minutes, or less than 20 minutes. In some embodiments, the shaping sub-step 206B may be the only step performed in a batch process executed by SCM 100. Alternately, the shaping sub-step 206B may be performed before or after a pre-mixing sub-step 206A and/or before one or more coating sub-steps 206C. After completing the shaping sub-step 206B, the motor 124 and treatment chamber 116 may be stopped and the spheroidized particles may either be discharged, or a coating material (e.g., pitch, carbon nanomaterials, CNTs, etc.) may be introduced to the treatment chamber 116 for coating the spheroidized particles during the coating sub-step 206C.

An example coating sub-step 206C performed by the SCM 100 may include rotating at least one coating material (i.e., a feed material 108, a single coating material or a blend of two or more coating materials) with the spherically shaped particles formed by the shaping sub-step 206B at a speed for a duration of time sufficient to cause particles of the coating material(s) to impact or collide with the spherically shaped particles and/or impact structures (i.e., 120, FIG. 1), thus, causing the coating material(s) to impact on, over, or otherwise conform to outer surfaces of the spherically shaped particles to coat the spherically shaped particles. The controller 126 may execute data, by the processor 202, and control the motor 124 to induce rotation of the treatment chamber 116 and particles therein at a speed of at least 50 m/s and a duration of time for at least one minute to coat the spherically shaped particles prior to discharge or prior to formation of a second coating at a second coating sub-step 206C. An example speed of rotation during the coating sub-step 206C is between about 60 and 100 m/s. An example duration of time for coating the particles at the coating sub-step 206C is between approximately 1 and 10 minutes (e.g., about 2 minutes, about 3 minutes, etc.). In some embodiments, only one coating sub-step 206C may be performed (e.g., to form a first coating comprising pitch). Alternately, the coating sub-step 206C may be repeated for adding multiple coatings over the spheroidized particles (e.g., to form a second coating comprising CNTs). In some embodiments, an entire batch process and, thus, completion of all sub-steps may be performed in less than an hour, less than 30 minutes, less than 10 minutes, or even less than 7 minutes (e.g., when a coating sub-step 206C is not performed).

Notably, during rotation of the coating material(s) and the spheroidized particles, the speed and/or collision forces result in a surface of the spheroidized particles increasing in temperature (e.g., heating to about 135° C.), which may increase the adherence of the coating materials on the spheroidized particles. In this way, robust coatings may be formed over the spherically shaped (core) particles. Such coatings may be optionally formed by use or application. For example, certain battery chemistries (e.g., use of NCA cathodes) may require uncoated SPGs, whereas other battery chemistries (e.g., use of LFP and/or NMC cathodes) may require CSPGs (e.g., pitch coated particles). In this way, the coating sub-step 206C is optional. That is, a batch process may include only a shaping sub-step 206B or only a pre-mixing sub-step 206A and a shaping sub-step 206B. Such heating may optionally be controlled by heating or cooling the treatment chamber 116, to maintain it at or above a preferred minimum temperature, to maintain it at or below a preferred maximum temperature or to maintain it at a preferred temperature.

Briefly, and to expand upon and further describe the shaping sub-step 206B and coating sub-step 206C, a description of the various conditions present within the SCM 100 during the various sub-steps is provided. In the SCM 100 and during the shaping and coating sub-steps, feed materials 108 such as larger "host" particles (i.e., natural or synthetic graphite flakes), are introduced along with or in a separate batch of smaller "guest" particles (i.e., powder coating material(s)) for coating the host particles. Feed material 108 containing graphite in its natural form is typically in flat, flaky structures, which need to be reshaped into spherically shaped particles to optimize properties such as tap density and electrochemical performance for applications including lithium-ion battery anodes. The SCM 100 imparts various forces upon the graphite flakes during a shaping process, such as a kinetic impact force, a centrifugal force, and a viscous drag force, each of which plays a role in shaping the graphite flakes into spherical particles. This high-energy dry impact milling process focuses on bending and compacting the feed material 108 (e.g., graphite flake feed material) rather than milling the flakes from the sides, thereby resulting in enhanced tap density, improved sphericity, and controlled particle size distribution.

Initially, a rapid rotation of feed material 108 imparted by the SCM 100 creates centrifugal forces that push the feed material 108 toward the wall of the treatment chamber 116. The feed material 108, or a portion thereof, are then continuously recycled through the SCM 100 via the recirculation duct 122 to and from the treatment chamber 116, passing through high-energy zones where the material experiences repeated mechanical impacts amongst particles traveling in an opposite direction. The centrifugal force acts on particles in the feed material 108 as the particles move outward in the treatment chamber 116 due to the rapid rotation of the rotatable structure 118A, such as a rotor. The centrifugal force pushes the particles toward the walls of the treatment chamber 116, leading to deformation and bending of the graphite flakes into spheres (e.g., or semi-spherical shapes such as ovals) as the particles experience increasing pressure. A kinetic impact force subsequently arises as a result of high-velocity collisions occurring between the graphite particles and between two counter current streams of particles-a first stream inside the treatment chamber 116 and a second stream of particles re-entering the treatment chamber 116 from the recirculation duct 122. While not being bound by any particular theory, it is understood that the kinetic force is responsible for the repeated bending and deforming of the graphite flakes into spheres. Additional kinetic impact possibilities likely exist between the particles and the cavity wall. However, such forces are believed to be kept to a minimum due to a viscous drag force.

Continuing with a description of conditions inside the SCM 100 during the shaping sub-step 206B, viscous drag force occurs as a result of the interaction between the moving particles and the surrounding air (or gas) inside the treatment chamber 116, which is closed during operation. This force, dictated by Stokes' law, acts opposite to the particle's motion and affects both the particle speed and the bending of the graphite flakes during the shaping sub-step 206B. In high-speed recirculating systems such as found inside the SCM 100, where the airflow is used to control the particle trajectories and maintain fluid-like behavior of the powder, the viscous drag force may contribute to the motion dynamics inside of the treatment chamber 116 and influence particle interactions. Since graphite flakes are thin and flat, a respective drag coefficient is relatively high, meaning the flakes experience a significant viscous drag force. This viscous drag force contributes to the motion dynamics inside the chamber, particularly influencing the particle residence time and frequency of collisions. As the graphite particles decelerate due to the viscous drag force, the graphite particles are then pulled back into the high-energy impact zones, where the graphite particles experience further bending, compacting, and spheroidization. As the graphite particles are spheroidized, the viscous drag force decreases significantly. In summary, during the shaping sub-step 206B involving graphite particles, the following forces act together: (i) the centrifugal force keeps the graphite particles in circulation, pressing them towards the walls of the treatment chamber 116 and bending the particles during the pressure buildup, (ii) the kinetic impact force ensures that the particles deform and bend with each collision, gradually reshaping the particles into spherical forms, and (iii) the viscous drag force governs the particle trajectories and velocity profiles within the treatment chamber 116, ensuring that the particles experience continuous motion and repeated impacts. In this way, the graphite flakes, which are naturally flat and thin, undergo bending and compacting due to the combined effects of centrifugal force and impact forces.

During the shaping sub-step 206B, as the graphite particles are pressed against the wall of the treatment chamber 116 by the centrifugal force, the particles experience a continuous pressure, which induces bending rather than simple milling. Unlike conventional milling processes where particles are chipped from the sides, here the flake is gradually compacted from its broad side. Each impact induces stress across the surface of the graphite flake. Given that graphite flakes are anisotropic in nature, bending forces act to fold the graphite flakes over time. Such bending leads to the gradual compaction of the particle into a spherical form as the impact energy is dissipated. The drag forces and centrifugal forces ensure that the graphite particles continue to recirculate through the high-energy impact zones. As the graphite particles decelerate due to drag, the graphite particles are swept back into areas of high shear, undergoing repeated bending and compacting events. Such cycling advantageously results in a uniform shaping of the graphite particles, a lower SSA, and a high tap density.

Referring now to conditions inside of the SCM 100 during the coating sub-step 206C, a volume of a powder coating material (i.e., a second type of feed material 108) may be added while the shaping sub-step 206B is still occurring. The powder coating material may include a specific particle size and/or size distribution, to be coated on surfaces of the now spherically shaped graphite particles. A speed of the SCM 100 may be adjusted or controlled (i.e., by the controller 126) to force all of the spherical particles out of the high impact energy zone during the coating sub-step 206C. The surface temperature of the particles, in excess of 180 C, is expected to at least partially melt the coating material and facilitate a smooth, uniform surface coating. The forces that work together for coating between "guest" particles and "host" particles include: (i) van der Waals and (2) mechanical Forces. During the coating sub-step 206C, fine "guest" particles (i.e., powder coating particles or materials) adhere to the surface of the spherically shaped graphite particles via mechanical forces, such as, van der Waals forces, electrostatic interactions, or even slight embedding into the softer surface of the host particle due to the mechanical impact. This is facilitated without any toxic binding chemicals or solvents.

Depending on the operating conditions of the SCM 100 (e.g., rotational speed, particle load, etc.), either a continuous or discrete coating of the guest coating particles is achieved. A continuous coating creates a uniform surface, while discrete coatings result in patches of guest material on the host particle. The SCM 100 is equipped with a recirculation duct 122, which allows particles to be constantly cycled through the high-energy zone in the treatment chamber 116. This ensures that the particles are exposed to uniform forces throughout the shaping and coating sub-steps, leading to a consistent coating and particle shaping.

Within the treatment chamber 116, the combination of a stator (e.g., support structure 118B) and rotor (e.g., rotatable structure 118A) design leads to the creation of cavities where high-velocity air or gas flows can assist in evacuating fine particles and maintaining a dynamic particle flow. This mechanism ensures that the particles are not stagnant and are, thus, continuously exposed to mechanical forces. At the end of a shaping and coating process, once the desired particle shape and coating have been achieved, a pressure-purge mechanism is used to expel the shaped and coated particles (i.e., CSPG particles) from the treatment chamber 116. This pressure-purge involves a controlled release of air or gas that pushes the CSPG particles through an exit valve into a cyclone where the particles are separated from the air and collected.

Still referring to FIG. 2A, and to now expand upon the example components in system 200, the SCM 100 and the device 210 may each include computers and/or hardware computing components. The SCM 100 and the device 210 may each include a processor 202, a memory 204, an input component 130A, an output component 130B, and/or a communication component 130C. For simplification of illustration purposes only, the device 210 is not shown to include each of these components, however, it should be understood that device 210 includes each of the processor 202, memory 204, input component 130A, output component 130B, and/or communication component 130C as necessary to receive and communicate data with the SCM 100 by way of the communications network 208. The device 210 may be a computer (e.g., a laptop computer, a desktop computer, etc.), a cell phone, another machine (e.g., a second SCM 100 or other machine in a manufacturing environment), or any other type of other device configured to send and/or receive data from SCM 100.

The processor 202 may include a central processing unit, a graphics processing unit, a microprocessor, a microcontroller, a digital signal processor, a field-programmable gate array, an application-specific integrated circuit, and/or another type of processing component. The processor 202 may be implemented in hardware, firmware, or a combination of hardware and software. In some embodiments, the processor 202 may include one or more processors capable of being programmed to perform one or more operations or processes described elsewhere herein.

The memory 204 may include volatile and/or nonvolatile memory. For example, the memory 204 may include random access memory (RAM), read only memory (ROM), a hard disk drive, and/or another type of memory (e.g., a flash memory, a magnetic memory, and/or an optical memory). The memory 204 may include internal memory (e.g., RAM, ROM, or a hard disk drive) and/or removable memory (e.g., removable via a universal serial bus connection). The memory 204 may be a non-transitory computer-readable medium. The memory 204 may store information, one or more instructions, and/or software (e.g., one or more software applications or programs) related to the operation of the SCM 100 or the device 210. In some embodiments, the memory 204 may include one or more memories that are coupled (e.g., communicatively coupled) to one or more processors (e.g., processor 202), such as via a bus (e.g., an electrical connection such as a wire, a trace, a lead, and/or a wireless bus). Communicative coupling between a processor 202 and a memory 204 may enable the processor 202 to read and/or process information stored in the memory 204 and/or to store information in the memory 204.

The input component 130A may enable the SCM 100 and the device 210 to receive input, such as user input and/or sensed input. For example, the input component 130A may include a touch screen, a keyboard, a keypad, a mouse, a button, a microphone, a switch, a sensor, a global positioning system sensor, a global navigation satellite system sensor, an accelerometer, a gyroscope, and/or an actuator. As an example, a user may cause the SCM 100 to input a feed material, discharge a feed material, and/or the like, via interacting with the input component 130A. The output component 130B may enable the SCM 100 and the device 210 to provide output, such as via a display, an interface, a screen, a speaker, and/or a light-emitting diode. The communication component 130C may enable the SCM 100 and the device 210 to communicate with other devices via a wired connection and/or a wireless connection. For example, the communication component 130C may include a receiver, a transmitter, a transceiver, a modem, a network interface card, and/or an antenna.

The SCM 100 may perform one or more operations or processes described herein. For example, a non-transitory computer-readable medium (e.g., memory 204) may store a set of instructions (e.g., one or more instructions or code) for execution by the processor 202 of the controller 126. The processor 202 may execute the set of instructions to perform one or more operations or processes described herein (e.g., see FIG. 8). In some embodiments, execution of the set of instructions, by one or more processors 202, causes the one or more processors 202 and/or the SCM 100 to perform one or more operations or processes described herein. In some embodiments, hardwired circuitry may be used instead of or in combination with the instructions to perform one or more operations or processes described herein. Additionally, or alternatively, the processor 202 may be configured to perform one or more operations or processes described herein. Thus, embodiments described herein are not limited to any specific combination of hardware circuitry and software.

The communications network 208 may include one or more wired and/or wireless networks. For example, the communications network 208 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of components shown in FIG. 2A are provided as an example. The SCM 100 and the device 210 may include additional components, fewer components, different components, or differently arranged components than those shown in FIG. 2A. Additionally, or alternatively, a set of components (e.g., one or more components) of the SCM 100 may perform one or more functions described as being performed by another set of components of the SCM 100. As indicated above, FIG. 2A is provided as an example. Other examples may differ from what is described in connection with FIG. 2A.

FIG. 2B schematically illustrates various example products 112 that may be produced using the graphite shaping and coating devices (i.e., SCM 100), systems (i.e., system 200), and methods described herein according to some embodiments. Notably, the products 112 described herein may be used as negative electrode materials for anodes of lithium-ion batteries.

A first example product 112A that may be produced by the SCM (100, FIG. 1) is an uncoated SPG having a 100% natural graphite core C1, formed by way of spheroidizing purified natural graphite particles. The SPG depicted by 112A lacks a coating. In this way, the pre-mixing and coating sub-steps described earlier may be obviated. In this way, a bulk quantity of particles corresponding to the first product 112A may be discharged by the SCM (100, FIG. 1) after a batch process that takes between about 5 to 10 minutes.

A second example product 112B that may be produced by the SCM (100, FIG. 1) is an uncoated SPG having a certain percentage (e.g., up to about 8 wt. %) of pitch derived carbon (denoted by the circle and "X" in the center of 112B) that is used as a binder inside of the graphite core. The graphite core C2 may be comprised of purified natural graphite (e.g., about 92 wt. % or more of purified natural graphite).

FIG. 2B further illustrates the respective third, fourth, and fifth example products 112C-112E. The third example product 112C that may be produced by the SCM (100, FIG. 1) is a CSPG having a 100% natural graphite core C3, and a pitch coating PC disposed over the core C3. In this way, the pre-mixing step described earlier may be obviated. A bulk quantity of particles corresponding to the third product 112C may be discharged by the SCM (100, FIG. 1) after a batch process that takes between 10 and 30 minutes. The fourth example product 112D that may be produced by the SCM (100, FIG. 1) is a SPG particle having a core C4 formed by blending natural graphite and synthetic graphite prior to spheroidization. In this way, the core C4 is a compositional blend of natural and synthetic graphite. The fourth product 112D lacks a coating. The blended core C4 may be comprised of a ratio of the two types of graphite (i.e., purified natural graphite to synthetic graphite) from 30:70 to 70:30. In this case, a batch process may include the pre-mixing and shaping sub-steps described earlier. The coating sub-step may be obviated. A fifth example product 112E that may be produced by the SCM (100, FIG. 1) is a CSPG having material comprising a blended core C5 and a pitch coating PC on the surface of the core C5. In this case, the pre-mixing, shaping, and coating sub-steps may each be performed in a batch process. The batch process may take between about 10 and 40 minutes. In this way, SPG and CSPG particles may be efficiently shaped and coated, as a batch, in under an hour.

As indicated above, FIG. 2B is provided as an example. Other examples may differ from what is described in connection with FIG. 2B.

Figure 3A:
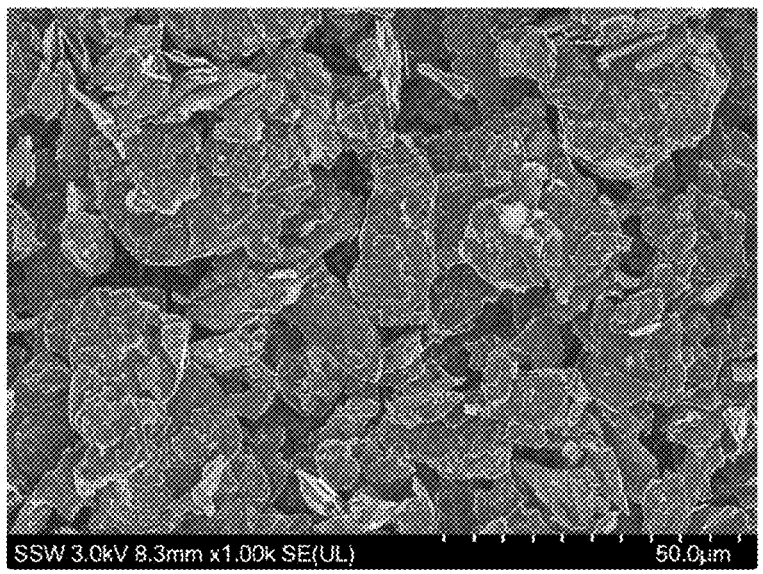
FIGS. 3A and 3B are Scanning Electron Microscope (SEM) images of example graphite feed material to be shaped and coated using the graphite shaping and coating devices, systems, and methods described herein for use as negative electrode materials, according to some embodiments.
Figure 3B:
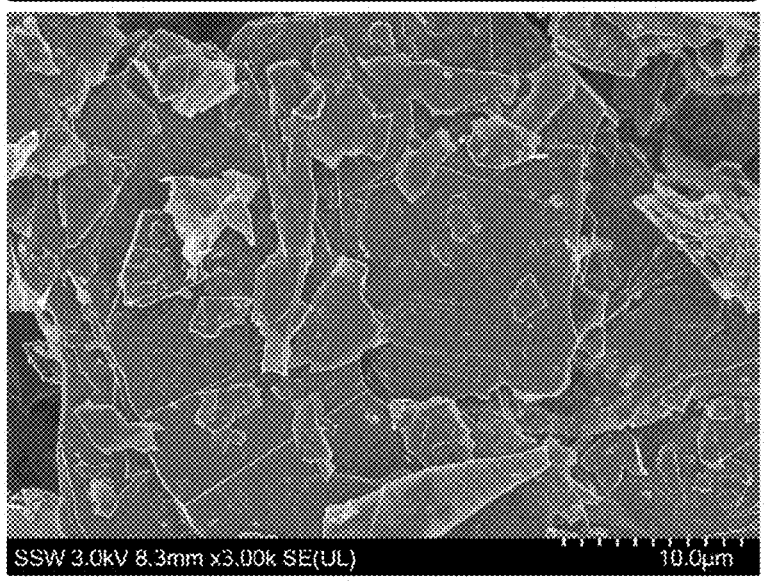
Figure 4A:
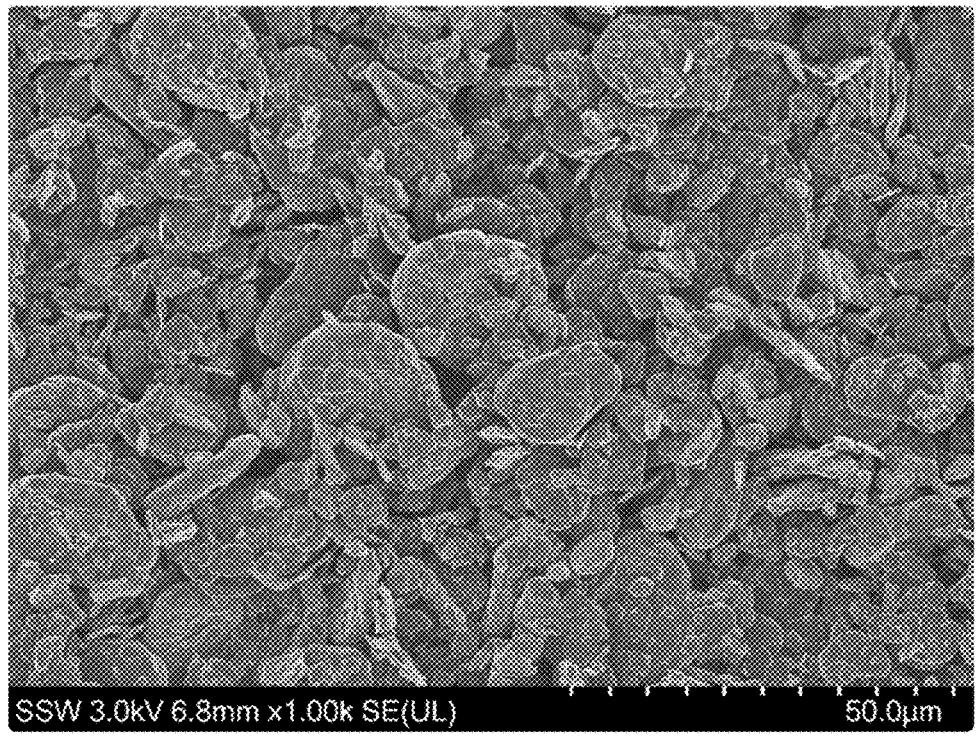
FIGS. 4A and 4B are SEM images of Coated Spherical Purified Graphite (CSPG) particles and resultant compositions that have been produced using the graphite shaping and coating devices, systems, and methods described herein for use as negative electrode materials, according to some embodiments.
Figure 4B:
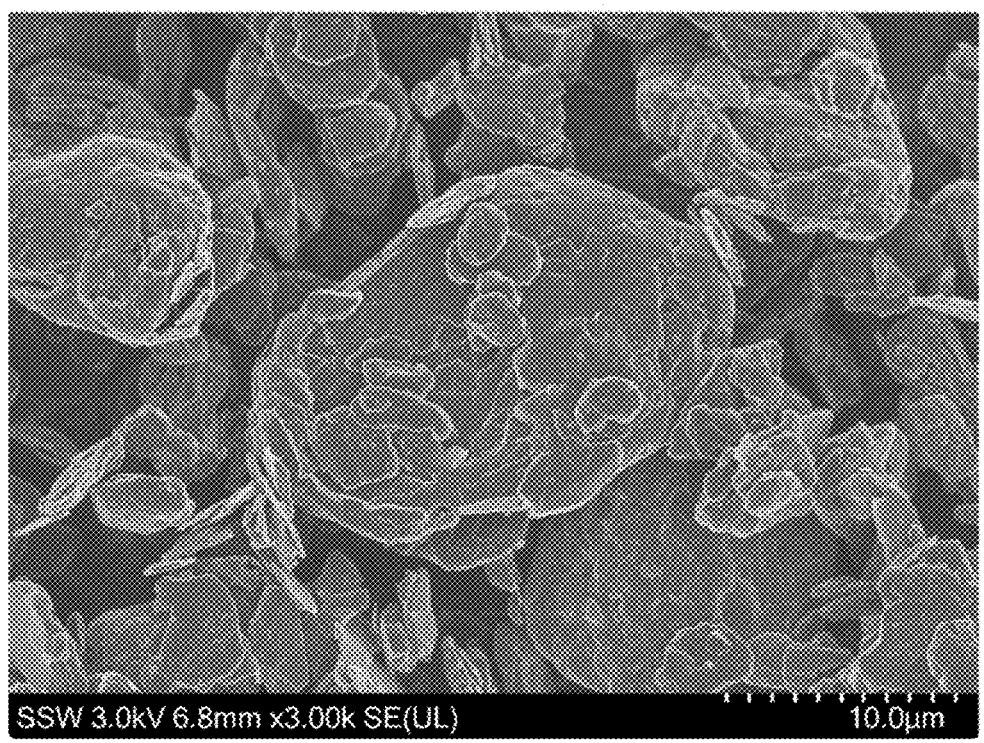

FIGS. 3A and 3B are Scanning Electron Microscope (SEM) images of example graphite feed material to be shaped and coated using the graphite shaping and coating devices, systems, and methods described herein for use as negative electrode materials, according to some embodiments. As FIGS. 3A and 3B illustrate, the graphite feed material may be in the form of purified natural graphite flakes. The flakes may range from about 5 and up to 700 micrometers (μm) in a longest dimension. After processing by the SCM (100, FIG. 1), the graphite flakes become spherically shaped particles. FIGS. 4A and 4B are SEM images of CSPG particles formed from the graphite flakes shown in FIGS. 3A and 3B. The products in images 4A and 4B may be used as negative electrode materials in lithium-ion batteries. After the graphite flakes are spheroidized, a powder pitch coating material may be applied using the SCM (100, FIG. 1) with or without additional post processing. The spherically shaped particles may comprise an average diameter of about 5 to 25 μm. FIGS. 3A, 3B, 4A, and 4B are provided as examples. Other examples may differ from what is described in connection with FIGS. 3A to 4B. One or more additional post processing steps may be performed after shaping and/or coating the graphite particles by the SCM (100, FIG. 1), such steps may include carbonization, graphitization, separation/sorting by size (e.g., diameter), and packaging. As used herein, the term "CSPG" refers to particles that have undergone shaping and coating but may have not yet undergone any of the post processing steps.

Figure 5:
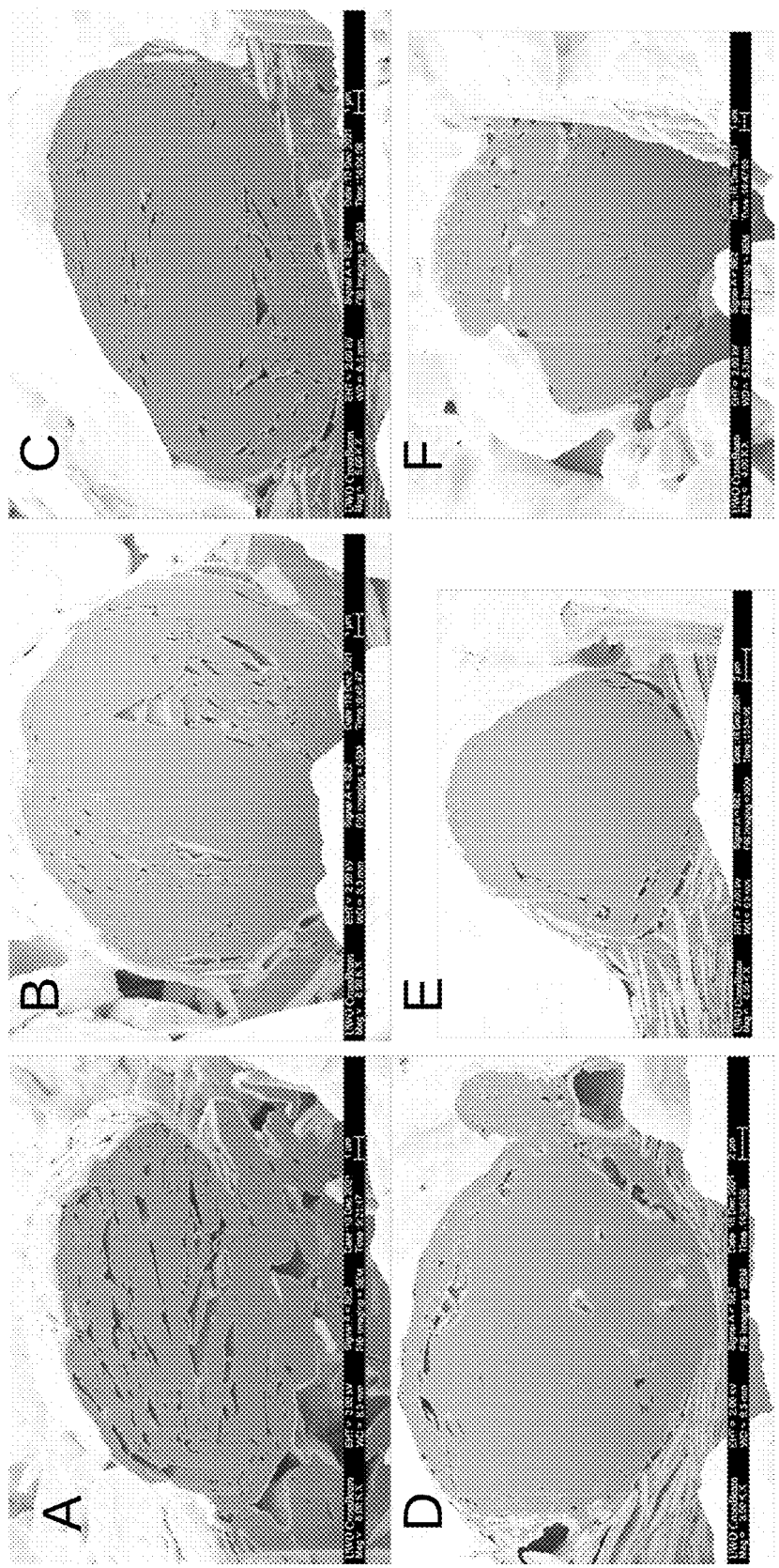
FIG. 5 depicts multiple SEM cross-sectional images of CSPG particles and resultant compositions that have been shaped and coated using the graphite shaping and coating devices, systems, and methods described herein for use as negative electrode materials, according to some embodiments.

FIG. 5 depicts multiple SEM cross-sectional images of CSPG particles and resultant compositions that have been shaped and coated using the graphite shaping and coating devices, systems, and methods described herein for use as negative electrode materials, according to some embodiments. Frame A of FIG. 5 depicts a CSPG formed by the devices, systems, and methods described earlier. The CSPG includes a natural graphite core and a pitch coating. The CSPG includes a plurality of pores inside of the core resulting from the graphite bending and folding over to form the spherical shape during spheroidization. The particles in FIG. 5 may range in diameter from about 5-25 μm. Frames B to F of FIG. 5 are images of other CSPGs that vary in core density and porosity. Notably, the core density and porosity may be controlled so that a range of densities and porosity levels may be achieved via controlling the rotational speed and/or duration of time the particles rotate in the treatment chamber. As an example, CSPG having more dense cores (i.e., lower porosity) may be achieved via rotation at higher speeds for longer lengths of time. Similarly, CSPG having less dense cores (e.g., higher porosity) may be achieved via rotation at lower speeds for shorter lengths of time. As indicated above, FIG. 5 is provided as an example. Other examples may differ from what is described in connection with FIG. 5.

Figure 6:
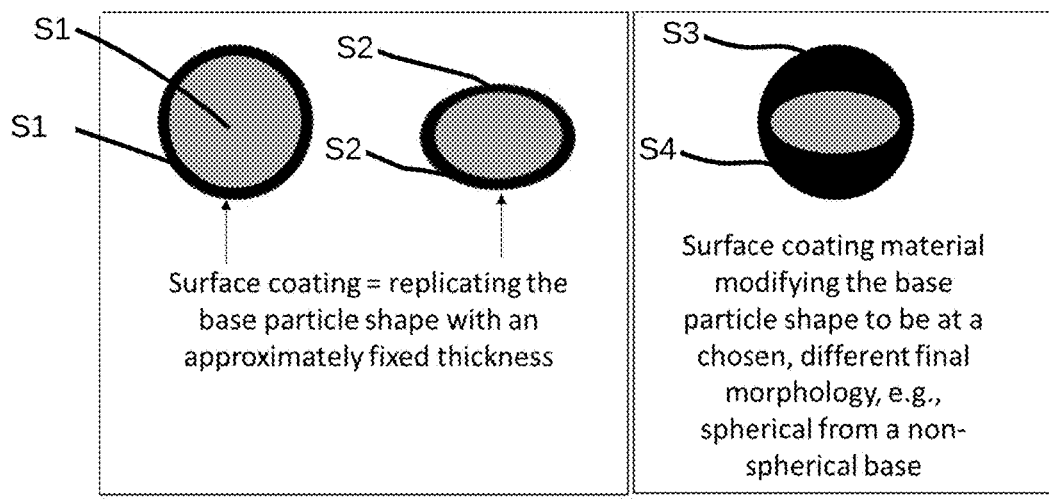
FIG. 6 schematically illustrates various example products that may be produced using the graphite shaping and coating devices, systems, and methods described herein according to some embodiments.

FIG. 6 schematically illustrates various additional example outputs or products (e.g., CSPG) that may be produced using the graphite shaping and coating devices, systems, and methods described herein according to some embodiments. As FIG. 6 illustrates, the coatings formed according to foregoing description are configured to not only coat the base particle (i.e., the underlying core or core particle) but may also contribute to the final shape of the final product or output. In some cases, the coating enables formation of a product having a final shape that is different than that of the underlying core particle, for provision of products having a preferred morphology. As FIG. 6 illustrates, a core particle may have a first shape S1 (e.g., a spherical shape). The coating formed on the core particle may uniformly coat the core particle such that the final product also has or is in the form of the first shape S1. Likewise, a core particle may have a second chape S2 (e.g., an oval or semi-spherical shape), and the coating formed on the core particle may coat the core particle so that the final product also has or includes the second shape S2. However, it is possible for the coating to be applied such that it forms a product having a different shape compared to the shape of the underlying core particle. In this way, a spherically shaped product may result even though the core is non-spherical. As FIG. 6 further illustrates, a core may have a third shape S3, which is non-spherical. A coating may be applied such that the final product has a different shape than the third shape S3. In this case, the coating may be applied such that the final product has a fourth shape S4, which is spherical or substantially spherically shaped. FIG. 6 is provided as an example. Other examples may differ from what is described in connection with FIG. 6.

FIGS. 7A to 7D illustrate various examples of data associated with operating SCM 100, and the result of using such data to predict and/or control product (i.e., output) parameters. The spherically shaped and coated graphite particles (i.e., CSPG particles) output from the SCM 100 have enhanced properties, such as decreased surface area, improved tap density, and improved electrochemical behavior. The coating, depending on the material used, can also impart additional enhanced properties such as improved conductivity or stability. Without being bound by a particular theory, it is believed that the physics of particle impacts, shearing, and centrifugal forces occurring inside of the SCM 100, combined with the mechanically induced coating process also occurring inside of the SCM 100, results in composite materials that are finely tuned for performance as anode material (i.e., negative electrode material).

Figure 7A:
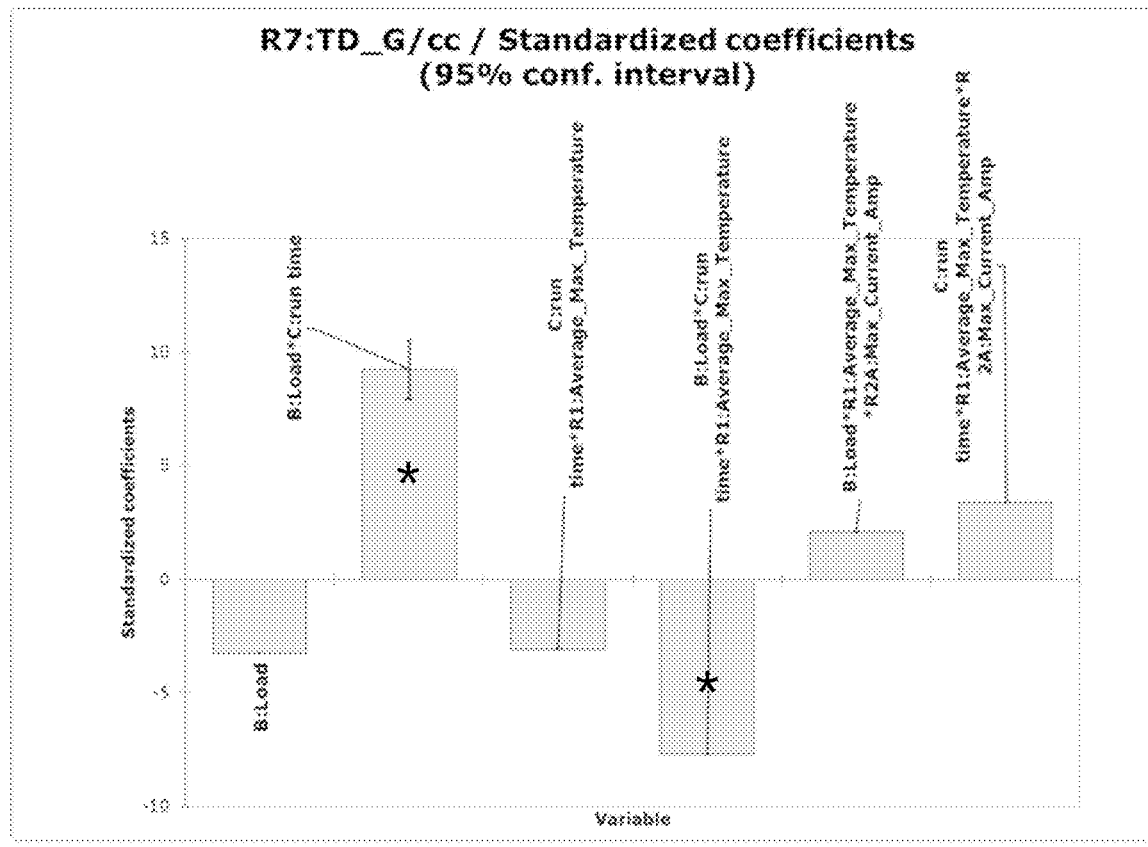
FIGS. 7A to 7D illustrate various examples of data used to generate models of parameters for a shaping and coating device and the impact of the parameters on product/output parameters.

Referring now to FIG. 7A, standardized coefficients are determined using various machine parameters (i.e., machine operating parameters or machine settings) associated with processes performed by the SCM (100, FIG. 1). The standardized coefficients express relative magnitudes of the effects of the various machine parameters on a variable, in this case, the variable being tap density of CSPG particles processed and output from the SCM (100, FIG. 1). That is, FIG. 7A shows the relationship between the machine parameters of the SCM (100, FIG. 1) and the tap density of CSPG particles output or discharged (i.e., 112, FIG. 2A) from the SCM as determined over numerous SCM runs. The various machine parameters used to create FIG. 7A include (i) machine load, (ii) machine run time, (iii) average maximum temperature inside the treatment chamber, and (iv) machine maximum current. The machine "load" refers to the force or weight that the SCM (100, FIG. 1) must overcome in order to rotate and recirculate material in the treatment chamber. As FIG. 7A illustrates, the parameters having the largest magnitude of effect upon tap density include those parameters in columns 2 and 4 of the bar chart (i.e., the columns designated by asterisks "*"). For example, as column 2 illustrates, the machine load and run time have the largest magnitude of effect upon the tap density of product output by the SCM (100, FIG. 1) after completion of a shaping and coating process. In this way, the tap density of CSPG particles can be controlled by controlling the load and run time of the SCM (100, FIG. 1).

Figure 7B:
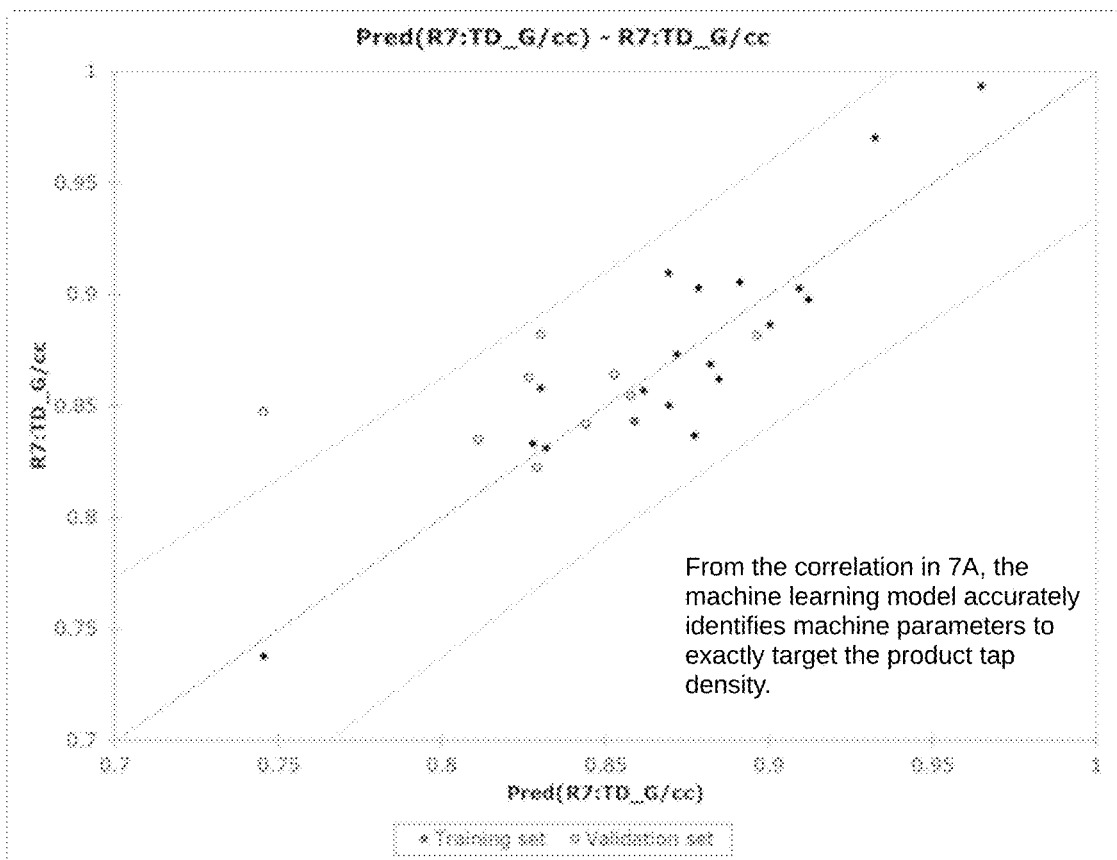

FIG. 7B shows the output from a machine learning model that correlates machine parameters, such as load and run time, to tap density. In this way, the machine learning model can be used to predict the tap density of product output from the SCM (i.e., 100, FIG. 1). As FIG. 7B illustrates, the training set for the machine model closely aligns with the validation set. In this way, it has been found that machine learning models can be used to accurately identify machine parameters to exactly target in order to produce or output a product having a desired tap density. In this way, the controller (126, FIG. 2A) can control settings or operating parameters of the SCM (100, FIG. 1) and produce CSPG particles having a targeted tap density.

The shaping and coating processes performed in high-energy dry particle systems like the SCM (100, FIG. 1) influence the tap density by improving particle morphology and surface properties. Factors such as particle spheroidization, the smoothness of the coating, control over particle size distribution, and appropriate mechanical energy inputs all play roles in achieving high tap density. Controlling these variables ensures that the particles can pack more efficiently, leading to better material performance in applications like battery technology or powder metallurgy.

Figure 7C:
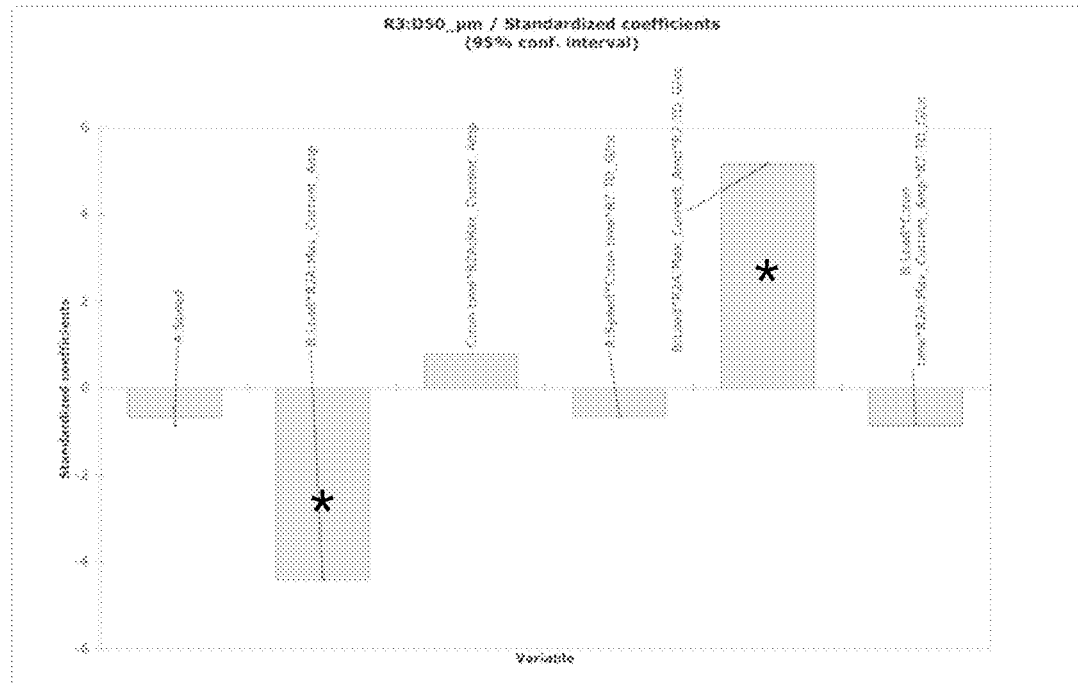

Referring to FIG. 7C, standardized coefficients are determined using various machine and material parameters associated with processes performed by an SCM (100, FIG. 1). The standardized coefficients express relative magnitudes of the effects of the various machine and material parameters on a variable, in this case, the variable being median particle size (D50). That is, FIG. 7C shows the relationship between the machine parameters of the SCM (100, FIG. 1) and the median particle size of CSPG particles output or discharged (i.e., 112, FIG. 2A) from the SCM as determined over numerous SCM runs. The various machine and material parameters used to create FIG. 7C include (i) machine speed, (ii) machine load, (iii) machine max current, (iv) machine run time, (v) tap density (g/cc). As FIG. 7C illustrates, the parameters having the largest magnitude of effect upon tap density include those parameters in columns 2 and 5 of the bar chart (i.e., the columns designated by asterisks "*"). For example, as column 2 illustrates, the machine load and max current have the largest magnitude of effect upon the median particle size of product output by the SCM (100, FIG. 1) after a shaping and coating process. In this way, by controlling the load and max current, the median particle size can also be controlled.

Figure 7D:
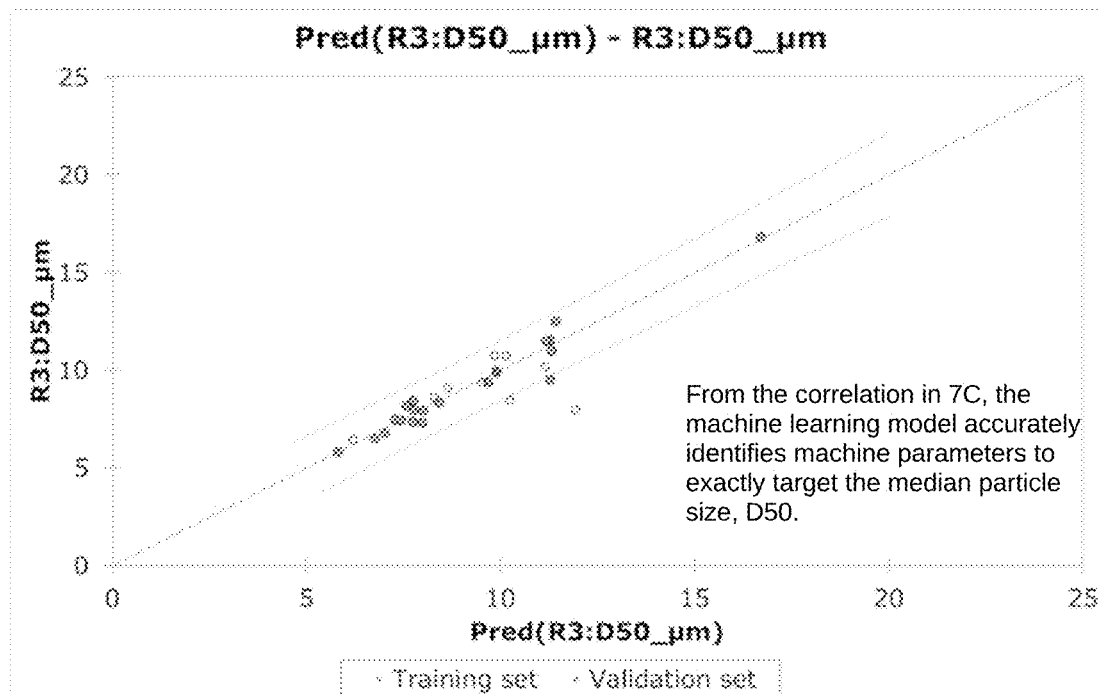

FIG. 7D shows the output from a machine learning model that correlates machine parameters, such as load and max current, to median particle size. In this way, the machine learning model can be used to predict the median particle size of product output from the SCM (i.e., 100, FIG. 1). As FIG. 7D illustrates, the training set for the machine model closely aligns with the validation set. In this way, it has been found that machine learning models can be used to accurately identify machine parameters to exactly target in order to produce or output a product having a desired median particle size. CSPG particles output by the SCM 100 may include a median particle size D50 (i.e., a median diameter) of between 5 and 25 μm and/or any value or range therebetween (e.g., D50 for CSPG particles output from SCM may include particles having a median diameter of 5-7 μm, 7-12 μm, 15-20 μm, etc.). Median particle sizes D50 that are greater than 25 am are also contemplated.

Further expanding upon various examples of physical principles that dictate the design of powder coating, particularly dry particle coating processes like those in the SCM 100, are centered around interparticle forces, mechanical energy input, and surface energy considerations. These principles ensure that coating materials/particles adhere to graphite particles, forming a uniform coating without using toxic chemicals, solvents, or liquids. The shaping and coating process performed by SCM 100 enables a high tap density material that is otherwise unachievable using traditional attrition milling, for example, results in a final CSPG product having tap density equal to or greater than 0.8 g/cc, equal to or greater than 1.0 g/cc, or equal to or greater than 1.2 g/cc. The parameters associated with operating the SCM 100 may be controlled to achieve a broad range of tap density and median particle sizes (i.e., median particle diameters). The tap density for CSPG particles discharged from the SCM 100 after a shaping and coating process as described herein may be greater than about 0.5 g/cc, greater than about 0.6 g/cc, greater than about 0.7 g/cc, greater than about 0.75 g/cc, or greater than about 0.8 g/cc in some embodiments. In some embodiments, the tap density for CSPG particles discharged from the SCM 100 after a shaping and coating process ranges from about 0.7 g/cc to about 1.5 g/cc. The tap density of such CSPG particles may average around 0.8 g/cc, 0.85 g/cc, or 1 g/cc, in some embodiments. CSPG particles having any suitable value of tap density are contemplated.

FIGS. 7A-7D are provided as an example. Other examples may differ from what is described in connection with FIGS. 7A-7D.

Figure 8:
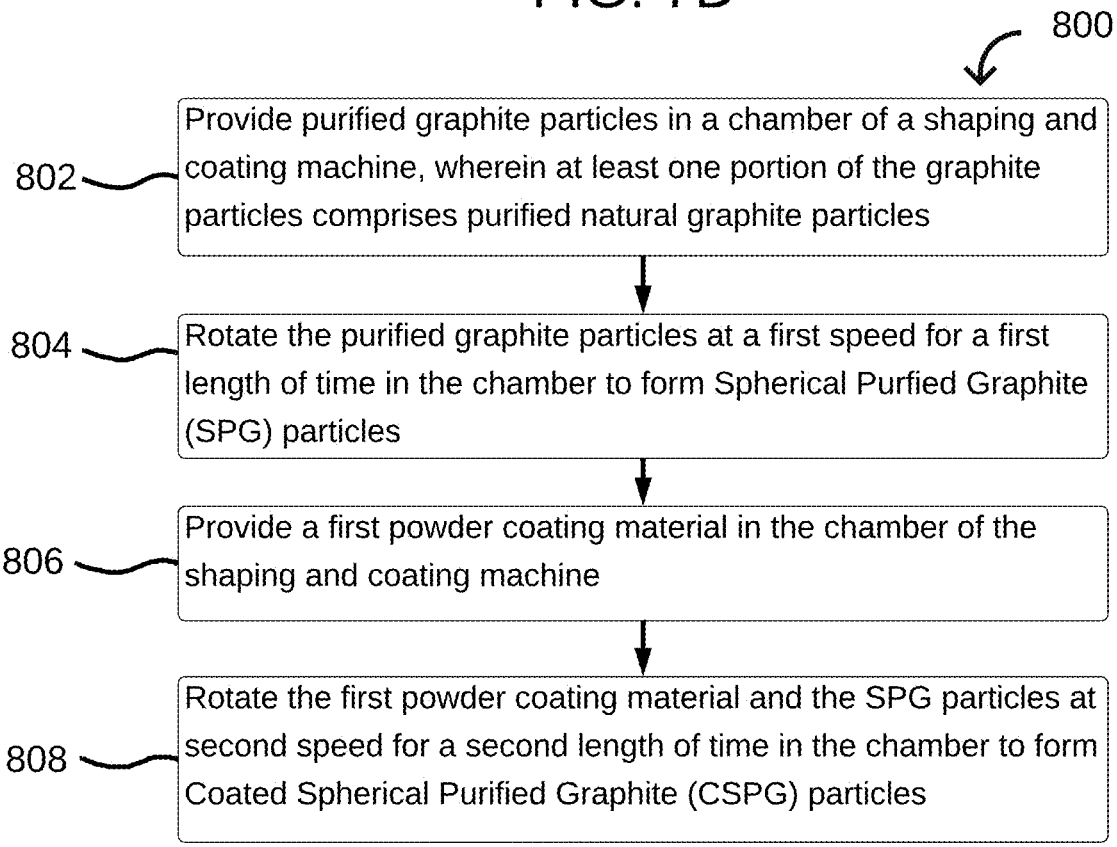
FIG. 8 is a flowchart outlining example steps of an example method for shaping and coating graphite according to some embodiments.

FIG. 8 is a flowchart outlining example steps of an example process or method 800 for shaping and coating graphite according to some embodiments. In some embodiments, one or more process blocks of FIG. 8 may be performed by the SCM (100, FIG. 1) and/or a component (e.g., controller 126, processor 202, memory 204, etc.) of the SCM (100, FIG. 1).

As shown in FIG. 8, method 800 may include providing graphite particles in a chamber of a shaping and coating machine (block 802). In some embodiments, the graphite particles may be provided in the treatment chamber of the SCM as described above in connection with FIGS. 1 and 2A). At least one portion (e.g., a weight, quantity, volume, etc.) of the graphite particles comprises purified natural graphite particles. In some embodiments, a second portion of the graphite particles comprises synthetic graphite particles.

As further shown in FIG. 8, method 800 may include rotating the graphite particles at a first speed for a first length of time in the chamber to form SPG particles (block 804). In some embodiments, the controller (126, FIG. 2A) or the processor and/or memory thereof, is configured to cause the motor (124, FIG. 2A) to rotate the graphite particles at the first speed for the first length of time in the chamber of the SCM (100, FIG. 1) to form the SPG particles. As described earlier, the first speed may be greater than 50 meters/second. In some cases, the first length of time is between 5 and 30 minutes.

As further shown in FIG. 8, method 800 may include providing a first powder coating material in the chamber of the shaping and coating machine (block 806). In some embodiments, the first coating material comprises pitch.

As further shown in FIG. 8, method 800 may include rotating the first powder coating material and the SPG particles at a second speed and for a second length of time in the chamber to form CSPG particles (block 808). In some embodiments, the controller (126, FIG. 2A) or the processor and/or memory thereof, is configured to consecutively rotate the first powder coating material and the SPG particles in the SCM (100, FIG. 1) at the second speed and for the second length of time in the chamber to form the CSPGs. In some embodiments, the second length of time is between 1 and 5 minutes. Further, a sum of the first length of time and the second length of time may be less than 30 minutes. The second speed may be the same as the first speed, or different (i.e., slower, or faster) than the first speed.

In some cases, the method may additionally include providing a second powder coating material in the chamber of the shaping and coating machine and rotating the second powder coating material and CSPG particles to provide a second coating over the CSPG particles. As described with respect to FIG. 2A, the second coating material may include carbon nanotubes.

Although FIG. 8 shows example blocks of method 800, in some embodiments, method 800 may include additional blocks, fewer blocks, different blocks, or differently arranged blocks than those depicted in FIG. 8. Additionally, or alternatively, two or more of the blocks of method 800 may be performed in parallel. As indicated above, FIG. 8 is provided as an example. Other examples may differ from what is described in connection with FIG. 8.

As described hereinabove, a method of shaping and coating graphite is provided. The method may include providing graphite particles in a chamber of a shaping and coating machine, wherein at least one portion of the graphite particles comprises purified natural graphite particles. The method may include rotating the graphite particles at a first speed for a first length of time in the chamber to form SPG particles. The method may include providing a first powder coating material in the chamber of the shaping and coating machine and rotating the first powder coating material and the SPG particles at a second speed and for a second length of time in the chamber to form CSPG particles.

In some embodiments, the first speed (i.e., linear velocity) is greater than 50 meters/second. In some embodiments, the second speed is the same as the first speed. In some embodiments, the second speed is different than the first speed. In some embodiments, the first length of time is between 5 and 30 minutes. In some embodiments, the second length of time is between 1 and 5 minutes. A second portion of the graphite particles may include synthetic graphite particles.

As described herein, the method may additionally include providing non-graphite particles (e.g., additives, binders, and/or the like) prior to providing the first powder coating material for enhancing performance of the CSPG. The first powder coating material may include pitch. The chamber of the shaping and coating machine may be operated in a temperature-controlled manner for at least a portion of the process described. The graphite shaping and coating machine may include a temperature-controlling system installed to control the chamber temperature for all or some of its operation. In some embodiments, the first coating disposed on the graphite core, in addition to being a surface coating, is a non-surface part of a particle shape. That is, the coating material not only coats the base particle but also contributes to the shape of the coated particle to make it different than that of the base particle, with a preferred morphology. Wherein a second coating is provided on the CSPG particles described herein, the second coating can comprise carbon nanotubes or non-graphite particles configured to enhance performance of the CSPG.

As additionally described hereinabove, a graphite shaping and coating machine is provided. The machine comprises a treatment chamber configured to receive and rotate graphite particles and a first powder coating material. The machine further comprises a recirculation duct comprising a duct inlet formed in the treatment chamber and a duct outlet formed in the treatment chamber. The recirculation duct is configured to re-direct a flow of the graphite particles between the duct inlet and the duct outlet as the treatment chamber rotates. The machine further comprises a motor and a controller. The controller is configured to cause the motor to rotate the graphite particles at a first speed for a first length of time in the treatment chamber to form SPG particles. The controller is further configured to rotate the first powder coating material and the SPG particles at a second speed and for a second length of time in the chamber to form CSPG particles.

As further described hereinabove, a graphite shaping and coating machine is provided. The machine comprises a treatment chamber configured to receive and rotate graphite particles and a first powder coating material. The machine further comprises a recirculation duct comprising a duct inlet formed in the treatment chamber and a duct outlet formed in the treatment chamber. The recirculation duct is configured to re-direct a flow of the graphite particles between the duct inlet and the duct outlet as the treatment chamber rotates. The machine further comprises a motor and a controller. The controller is configured to cause the motor to rotate the graphite particles in the treatment chamber to form SPG particles. The controller is further configured to rotate the first powder coating material and the SPG particles in the chamber to form CSPG particles. The controller induces rotation so that mechanical forces are applied to the SPG particles and the powder coating material during rotation. The mechanical forces include forces such as impact, shearing, and centrifugal forces. The forces break agglomerates and promote the adhesion of coating material to SPG particles by bringing them into close contact, where van der Waals or other forces can then take effect causing the coating material to adhere to the SPG particles. As known in the art, van der Waals forces are the weak intermolecular forces that act between particles at short ranges. In dry powder coating, the small coating material particles (i.e., guest particles) adhere to the surface of larger graphite particles (i.e., host particles) due to van der Waals attractions. This force allows coating particles to adhere to the graphite particles in situations where no chemical bonds or other strong interactions are used.

As additionally described hereinabove, a negative electrode material is provided. The negative electrode material may include CSPG particles. In some cases, the negative electrode material includes a graphite core that is spherical in shape. A coating is adhered to the spherical shape. The graphite core may comprise purified natural graphite, or a blend of purified natural graphite and synthetic graphite. Where a blend is provided, the blend can comprise a ratio of a first weight percent (wt. %) of the purified natural graphite and a second wt. % of the synthetic graphite is between 30:70 and 70:30.

The present inventive concepts are described herein with reference to the accompanying drawings and examples, in which embodiments are shown. Additional embodiments may take on many different forms and should not be construed as limited to the embodiments set forth herein. Rather, these embodiments are provided so that this disclosure will be thorough and complete and will fully convey the scope of the inventive concepts to those skilled in the art. Modifications and variations may be made in light of the above disclosure or may be acquired from practice of the embodiments described herein.

Like numbers refer to like elements throughout. In the figures, the thickness of certain lines, layers, components, elements, or features may be exaggerated for clarity.

No element, act, step, or instruction used and described herein should be construed as critical or essential unless explicitly described as such. Further, the terminology used herein is for the purpose of describing particular embodiments only and is not intended to be limiting thereof. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" may be replaced with "a plurality of" and vice versa. Also, as used herein, the term "or" is intended to be inclusive when used in a series and may be used interchangeably with "and/or" unless explicitly stated otherwise (e.g., if used in combination with "either" or "only one of").

As used herein, the term "and/or" includes any and all combinations of one or more of the associated listed items. As used herein, phrases such as "between X and Y" and "between about X and Y" and "between approximately X and Y" should be interpreted to include X and Y. As used herein, phrases such as "between about X and Y" mean "between about X and about Y." As used herein, phrases such as "from about X to Y" mean "from about X to about Y." The terms "substantially," "approximately," and "about" are interchangeable and should be understood to mean "within reasonable tolerances of manufacturing and measurement" and include variations of up to 20%.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the terms "machine" and "device" are synonymous and may be used interchangeably. As used herein, the term "powder" refers to a material comprised of a plurality of particles or particulate. The term "particles" encompasses flakes (i.e., pre-shaped particles), spheres (i.e., post-shaped particles), and other particle shapes. As used herein, the terms "base" and "core" are synonymous and may be used interchangeably.

It will be understood that when an element is referred to as being "on," "attached" to, "connected" to, "coupled" with, "contacting," etc., another element, it may be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

Even though particular combinations of elements or features are recited in the claims and/or disclosed in the specification, these combinations are not intended to limit the disclosure of embodiments described herein. Many of these elements may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

The foregoing is illustrative of the present inventive concept and is not to be construed as limiting thereof. Although a few example embodiments have been described, those skilled in the art will readily appreciate that many modifications are possible in the exemplary embodiments without materially departing from the novel teachings of this inventive concept. Accordingly, all such modifications are intended to be included within the scope of this inventive concept as defined in the claims. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims.

What is claimed is:

1. A method of shaping and coating graphite comprising:
   providing graphite particles in a treatment chamber of a shaping and coating machine, wherein at least one portion of the graphite particles comprises purified natural graphite particles, wherein the shaping and coating machine comprises a motor, a controller, and a recirculation duct comprising a duct inlet formed in the treatment chamber and a duct outlet formed in the treatment chamber, wherein the recirculation duct is configured to re-direct a flow of the graphite particles between the duct inlet and the duct outlet as the treatment chamber rotates;
   rotating the graphite particles at a first speed for a first length of time in the treatment chamber to form Spherical Purified Graphite (SPG) particles;
   providing a first powder coating material in the treatment chamber of the shaping and coating machine; and
   rotating the first powder coating material and the SPG particles at a second speed and for a second length of time in the treatment chamber to form Coated Spherical Purified Graphite (CSPG) particles, wherein the controller is configured to cause the motor to rotate the graphite particles and the first powder coating material.

2. The method of claim 1, wherein the first speed is greater than 50 meters/second.

3. The method of claim 2, wherein the second speed is the same as the first speed.

4. The method of claim 2, wherein the second speed is different than the first speed.

5. The method of claim 1, wherein the first length of time is between 5 and 30 minutes.

6. The method of claim 1, wherein the second length of time is between 1 and 5 minutes.

7. The method of claim 1, wherein a second portion of the graphite particles comprises synthetic graphite particles.

8. The method of claim 1 further comprising providing non-graphite particles prior to providing the first powder coating material for enhancing performance of the CSPG.

9. The method of claim 1, wherein the first powder coating material comprises pitch.

10. The method of claim 9, further comprising:
    providing a second powder coating material in the chamber of the shaping and coating machine; and
    rotating the second powder coating material and CSPG particles to provide a second coating over the CSPG particles.

11. The method of claim 10, wherein the second coating material comprises carbon nanotubes.

12. The method of claim 10, wherein the second coating material comprises non-graphite particles configured to enhance performance of the CSPG.

* * * * *